(12) United States Patent
Kang et al.

(10) Patent No.: US 7,240,503 B2
(45) Date of Patent: Jul. 10, 2007

(54) ELECTRICITY GENERATING AND AIR CONDITIONING SYSTEM WITH DEHUMIDIFIER

(75) Inventors: Seung Tak Kang, Seoul (KR); Chang Min Choi, Seoul-si (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 11/040,134

(22) Filed: Jan. 24, 2005

(65) Prior Publication Data

US 2006/0037343 A1    Feb. 23, 2006

(30) Foreign Application Priority Data

Aug. 17, 2004    (KR)    ............... 10-2004-0064818

(51) Int. Cl.
    *F25B 27/02*    (2006.01)
(52) U.S. Cl. ........................... 62/238.7; 62/271
(58) Field of Classification Search ............ 62/94, 62/238.6–238.7, 271, 323.1
    See application file for complete search history.

(56) References Cited

U.S. PATENT DOCUMENTS

| | | | | |
|---|---|---|---|---|
| 2,122,013 | A | * | 6/1938 | Smith .............................. 62/94 |
| 4,222,244 | A | | 9/1980 | Meckler |
| 4,635,446 | A | | 1/1987 | Meckler |
| 4,697,434 | A | * | 10/1987 | Yuyama ...................... 62/238.7 |
| 4,723,417 | A | | 2/1988 | Meckler |
| 4,819,444 | A | | 4/1989 | Meckler |
| 4,910,969 | A | * | 3/1990 | Dalin et al. ................. 62/238.6 |
| 4,930,322 | A | | 6/1990 | Ashley et al. |
| 4,987,748 | A | | 1/1991 | Meckler |

FOREIGN PATENT DOCUMENTS

| | | |
|---|---|---|
| DE | 299 15 459 U1 | 6/2000 |
| DE | 20 2004 003 532 U1 | 6/2004 |
| EP | 0 080 764 A1 | 6/1983 |
| JP | 2004-226017 A | 8/2004 |
| WO | WO-87/05683 A1 | 9/1987 |

\* cited by examiner

*Primary Examiner*—William E. Tapolcai
(74) *Attorney, Agent, or Firm*—Birch, Stewart, Kolasch & Birch, LLP

(57) ABSTRACT

An electricity generating and air conditioning system with a dehumidifier. The system includes an engine, a generator connected to an output shaft of the engine to generate electricity, a heat pump type air conditioner, through which a refrigerant is circulated, the heat pump type air conditioner comprising a compressor, a directional valve, an outdoor heat exchanger, an expansion device, and an indoor heat exchanger, an indoor dehumidifying agent body to dehumidify indoor air, an indoor regeneration heater to regenerate the indoor dehumidifying agent body, and a waste heat recovering means to supply waste heat of the engine to the indoor regeneration heater, and thus, to allow the indoor regeneration heater to use the supplied waste heat as a heat source for the regeneration of the indoor dehumidifying agent body, or to supply the waste heat of the engine to the refrigerant of the heat pump type air conditioner, so that the system exhibits maximal efficiency.

17 Claims, 16 Drawing Sheets

ELECTRICITY GENERATING AND AIR CONDITIONING SYSTEM WITH DEHUMIDIFIER

BACKGROUND OF THE INVENTION

1. Field of the Invention

The present invention relates to an electricity generating and air conditioning system with a dehumidifier, and, more particularly, to an electricity generating and air conditioning system with a dehumidifier in which exhaust gas or cooling water of an engine is used to enhance the heating performance of an air conditioner or to dehumidify indoor air.

2. Description of the Related Art

In general, electricity generating and air conditioning systems generate electricity by use of a rotating force outputted from an engine, and operate an air conditioner by use of the generated electricity. Such electricity generating and air conditioning systems are mainly used for multi-type air conditioners or large-scale air conditioners.

Such electricity generating and air conditioning systems include an engine, a generator connected to an output shaft of the engine to generate electricity, and an air conditioner, which is operated, using the electricity generated from the generator.

However, such a conventional electricity generating and air conditioning system has a problem in that waste heat of exhaust gas discharged from an engine and waste heat of cooling water used to cool the engine are inefficiently re-used, so that the system exhibits a low energy efficiency.

SUMMARY OF THE INVENTION

The present invention has been made in view of the above-mentioned problems, and it is an object of the invention to provide an electricity generating and air conditioning system with a dehumidifier in which waste heat of an engine is recovered to be used as a heat source to dehumidify indoor air or to heat a refrigerant, so that the system exhibits a maximal enhancement in efficiency.

Another object of the invention is to provide an electricity generating and air conditioning system with a dehumidifier in which waste heat of an engine is recovered to be used as a heat source to dehumidify outdoor air blown to an outdoor heat exchanger, so that it is possible to prevent the outdoor heat exchanger from being frosted, and to achieve an enhancement in heating performance.

In accordance with one aspect, the present invention provides an electricity generating and air conditioning system comprising: an engine; a generator connected to an output shaft of the engine to generate electricity; a heat pump type air conditioner, through which a refrigerant is circulated, the heat pump type air conditioner comprising a compressor, a directional valve, an outdoor heat exchanger, an expansion device, and an indoor heat exchanger; an indoor dehumidifying agent body to dehumidify indoor air; an indoor regeneration heater to regenerate the indoor dehumidifying agent body; and waste heat recovering means to supply waste heat of the engine to the indoor regeneration heater, and thus, to allow the indoor regeneration heater to use the supplied waste heat as a heat source for the regeneration of the indoor dehumidifying agent body, or to supply the waste heat of the engine to the refrigerant of the heat pump type air conditioner.

The waste heat recovering means may comprise a cooling water heat exchanger to absorb heat from cooling water used to cool the engine, and an exhaust gas heat exchanger to absorb heat from exhaust gas discharged from the engine.

The waste heat recovering means may further comprise a compressor discharge line heater to heat a discharge line of the compressor, and heat transfer means to transfer heat from at least one of the cooling water heat exchanger and the exhaust gas heat exchanger to the compressor discharge line heater during a heating operation of the heat pump type air conditioner, and to transfer heat from at least one of the cooling water heat exchanger and the exhaust gas heat exchanger to the indoor regeneration heater during a cooling operation of the heat pump type air conditioner.

The electricity generating and air conditioning system may further comprise an outdoor dehumidifying agent body to dehumidify outdoor air blown to the outdoor heat exchanger, an outdoor regeneration heater to regenerate the outdoor dehumidifying agent body, and a radiating heat exchanger to radiate heat from at least one of the cooling water heat exchanger and the exhaust gas heat exchanger.

The waste heat recovering means may further comprise second heat transfer means to transfer heat from at least one of the cooling water heat exchanger and the exhaust gas heat exchanger to the outdoor regeneration heater during a heating operation of the heat pump type air conditioner, and to transfer heat from at least one of the cooling water heat exchanger and the exhaust gas heat exchanger to the radiating heat exchanger during a cooling operation of the heat pump type air conditioner.

The electricity generating and air conditioning system may further comprise an outdoor dehumidifying agent body to dehumidify outdoor air blown to the outdoor heat exchanger, an outdoor regeneration heater to regenerate the outdoor dehumidifying agent body, and a water-heating heat exchanger to heat water.

The waste heat recovering means may further comprise second heat transfer means to transfer heat from at least one of the cooling water heat exchanger and the exhaust gas heat exchanger to the outdoor regeneration heater during a heating operation of the heat pump type air conditioner, and to transfer heat from at least one of the cooling water heat exchanger and the exhaust gas heat exchanger to the water-heating heat exchanger during a cooling operation of the heat pump type air conditioner.

In accordance with another aspect, the present invention provides an electricity generating and air conditioning system comprising: an engine; a generator connected to an output shaft of the engine to generate electricity; a heat pump type air conditioner, through which a refrigerant is circulated, the heat pump type air conditioner comprising a compressor, a directional valve, an outdoor heat exchanger, an expansion device, and an indoor heat exchanger; an outdoor dehumidifying agent body to dehumidify outdoor air blown to the outdoor heat exchanger; an outdoor regeneration heater to regenerate the outdoor dehumidifying agent body; a radiating heat exchanger to radiate heat from at least one of the cooling water heat exchanger and the exhaust gas heat exchanger; and waste heat recovering means to supply waste heat of the engine to the outdoor regeneration heater, and thus, to allow the outdoor regeneration heater to use the supplied waste heat as a heat source for the regeneration of the outdoor dehumidifying agent body, or to supply the waste heat of the engine to the radiating heat exchanger.

In accordance with another aspect, the present invention provides an electricity generating and air conditioning system comprising: an engine; a generator connected to an output shaft of the engine to generate electricity; a heat pump type air conditioner, through which a refrigerant is circulated, the heat pump type air conditioner comprising a compressor, a directional valve, an outdoor heat exchanger, an expansion device, and an indoor heat exchanger; an outdoor dehumidifying agent body to dehumidify outdoor air blown to the outdoor heat exchanger; an outdoor regeneration heater to regenerate the outdoor dehumidifying agent body; a water-heating heat exchanger to heat water; and waste heat recovering means to supply waste heat of the engine to the outdoor regeneration heater, and thus, to allow the outdoor regeneration heater to use the supplied waste heat as a heat source for the regeneration of the outdoor dehumidifying agent body, or to supply the waste heat of the engine to the water-heating heat exchanger.

The heat pump type air conditioner may use the electricity generated from the generator.

At least one of the engine, the generator, the compressor, the directional valve, the outdoor heat exchanger, the expansion device, and the indoor heat exchanger may comprise a plurality of ones.

The electricity generating and air conditioning system according to the present invention has an advantage in that the waste heat of the engine is used to heat the refrigerant or to regenerate the indoor dehumidifying agent body, so that the system exhibits a high energy efficiency and enhances the pleasantness of a confined space to be air-conditioned.

The electricity generating and air conditioning system according to the present invention also has advantages in that the waste heat of the engine is used to prevent the outdoor heat exchanger from being frosted or is simply discharged to the atmosphere, so that the system exhibits a high heating performance and a high radiation performance.

In addition, the electricity generating and air conditioning system according to the present invention also has advantages in that the waste heat of the engine is used to prevent the outdoor heat exchanger from being frosted or to heat water, so that the system exhibits a high heating performance and a high energy efficiency.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of an electricity generating and air conditioning system according to the present invention will be described with reference to the annexed drawings.

Figure 1:
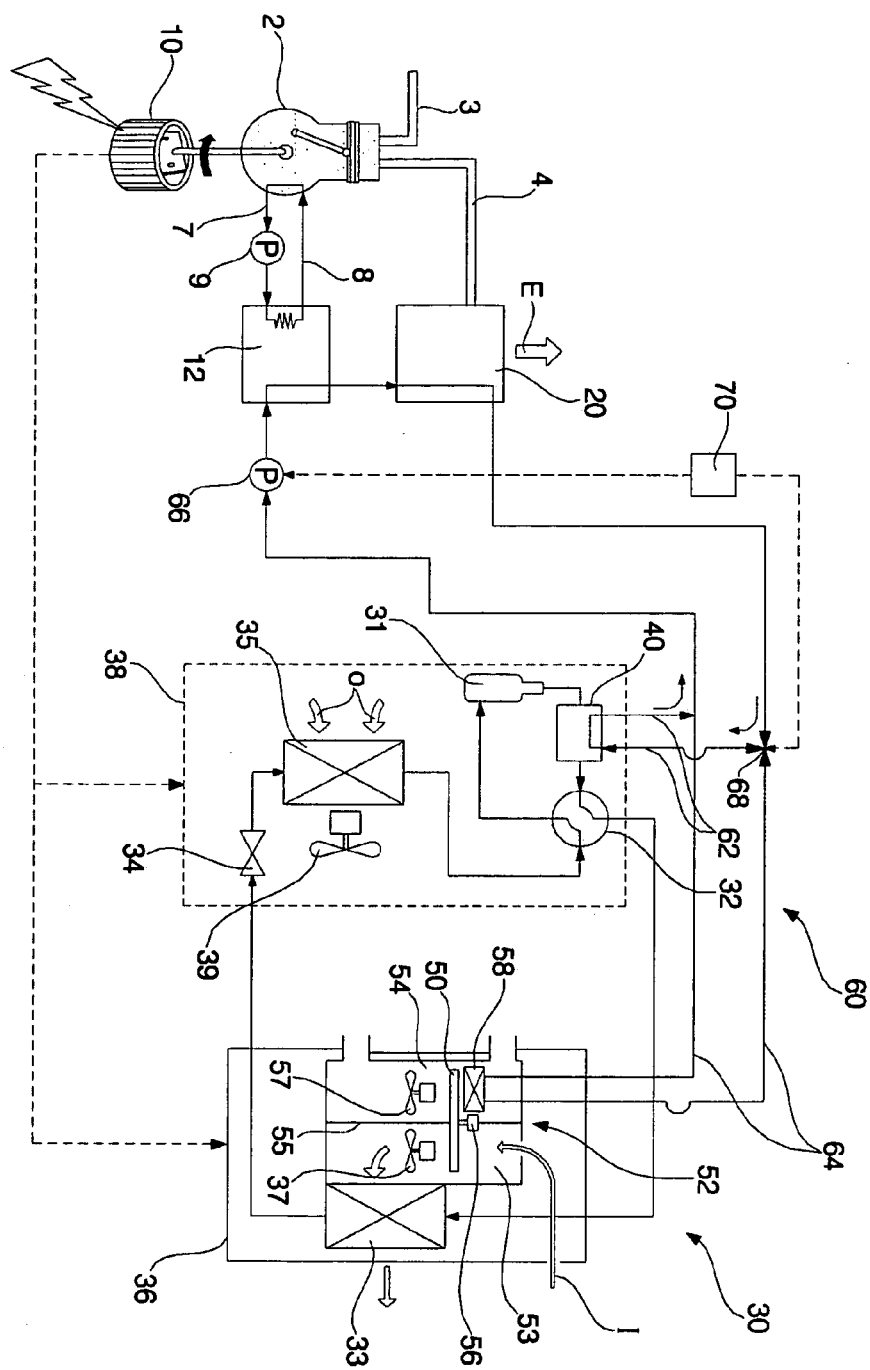
FIG. 1 is a schematic diagram of an electricity generating and air conditioning system with a dehumidifier according to a first embodiment of the present invention, illustrating a state in which the system operates in a heating mode.
Figure 2:
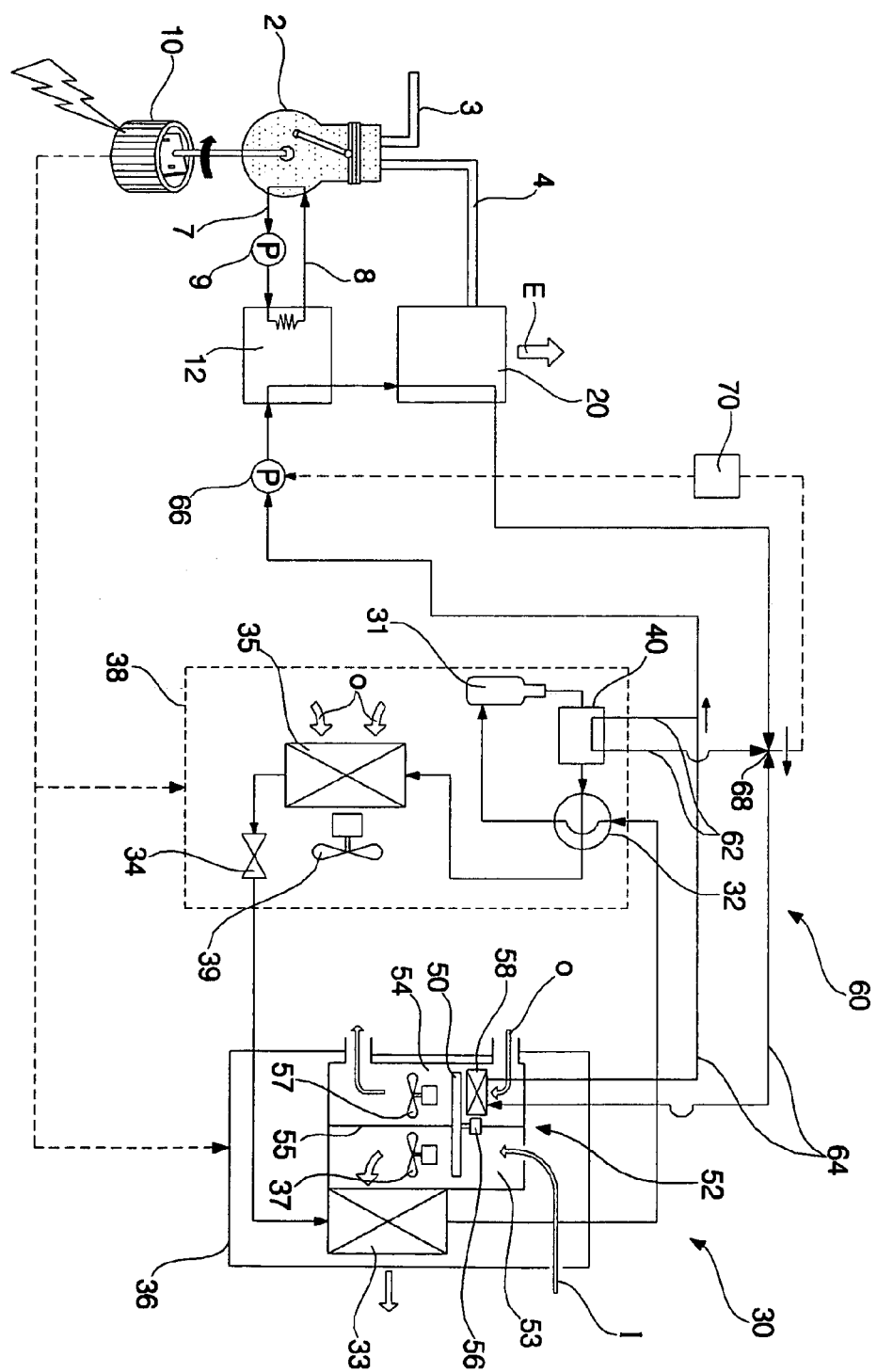
FIG. 2 is a schematic diagram of the electricity generating and air conditioning system with the dehumidifier according to the first embodiment of the present invention, illustrating a state in which the system operates in a cooling mode.

FIG. 1 is a schematic diagram of an electricity generating and air conditioning system with a dehumidifier according to a first embodiment of the present invention, illustrating a state in which the system operates in a heating mode. FIG. 2 is a schematic diagram of the electricity generating and air conditioning system with the dehumidifier according to the first embodiment of the present invention, illustrating a state in which the system operates in a cooling mode.

As shown in FIGS. 1 and 2, the electricity generating and air conditioning system includes an engine 2, a generator 10 connected to an output shaft of the engine 2 to generate electricity, a cooling water heat exchanger 12 to absorb heat from cooling water used to cool the engine 2, and an exhaust gas heat exchanger 20 to absorb heat from exhaust gas discharged from the engine 2. The electricity generating and air conditioning system also includes a heat pump type air conditioner 30, which uses the electricity generated from the generator 10, and includes a compressor 31, a directional valve 32, an indoor heat exchanger 33, an expansion device 34, and an outdoor heat exchanger 35. The electricity generating and air conditioning system further includes a compressor discharge line heater 40 to heat a discharge line of the compressor 31, an indoor dehumidifying agent body 50 to dehumidify indoor air I, an indoor regeneration heater 58 to regenerate the indoor dehumidifying agent body 50, and a heat transfer means 60 to transfer heat from at least one of the cooling water heat exchanger 12 and exhaust gas heat exchanger 20 to the compressor discharge line heater 40 during a heating operation of the heat pump type air conditioner 30 and to transfer heat from at least one of the cooling water heat exchanger 12 and exhaust gas heat exchanger 20 to the indoor regeneration heater 58 during a cooling operation of the heat pump type air conditioner 30.

The engine 2 includes a combustion chamber defined in the interior of the engine 2.

A fuel tube 3 and an exhaust tube 4 are connected to the engine 2. The fuel tube 3 is adapted to supply fuel such as liquefied gas or liquefied petroleum gas into the combustion chamber. The exhaust tube 4 is adapted to guide exhaust gas discharged from the combustion chamber.

The exhaust tube 4 is arranged between the engine 2 and the exhaust gas heat exchanger 20 to guide exhaust gas E discharged from the engine 2 to the exhaust gas heat exchanger 20.

The cooling water heat exchanger 12 is connected to the engine 2 via cooling water circulation conduits 7 and 8 so that the cooling water, which is heated while cooling the engine 2, transfers heat to the cooling water heat exchanger 12 while passing through the cooling water heat exchanger 12, and is then again circulated into the engine 2.

A cooling water circulation pump 9 is connected to one of the engine 2, cooling water heat exchanger 12, and cooling water circulation conduits 7 and 8.

The generator 10 may be an AC generator or a DC generator.

In a heating operation of the heat pump type air conditioner 30, refrigerant, which has been compressed in the compressor 31, flows through the directional valve 32, indoor heat exchanger 33, expansion device 34, outdoor heat exchanger 35, and directional valve 32, in this order, and then enters the compressor 31, as shown in FIG. 1. Thus, the refrigerant is circulated. In this operation, the outdoor heat exchanger 35 functions as an evaporator, whereas the indoor heat exchanger 33 functions as a condenser, and thus, discharges heat to indoor air.

On the other hand, in a cooling operation of the air conditioner 30, refrigerant, which has been compressed in the compressor 31, flows through the directional valve 32, outdoor heat exchanger 35, expansion device 34, indoor heat exchanger 33, and directional valve 32, in this order, and then enters the compressor 31, as shown in FIG. 2. Thus, the refrigerant is circulated. In this operation, the outdoor heat exchanger 35 functions as a condenser, whereas the indoor heat exchanger 33 functions as an evaporator, and thus, absorbs heat from indoor air.

The heat pump type air conditioner 30 further includes an indoor fan or blower 37 to blow indoor air I to the indoor heat exchanger 33. The indoor heat exchanger 33, indoor fan 37, indoor dehumidifying agent body 50, and regeneration heater 58 constitute an indoor unit 36 of the heat pump type air conditioner 30.

The heat pump type air conditioner 30 further includes an outdoor fan or blower 39 to blow outdoor air O to the outdoor heat exchanger 35. The compressor 31, directional valve 32, expansion device 34, outdoor heat exchanger 35, and outdoor fan 39 constitute an outdoor unit 38 of the heat pump type air conditioner 30.

During a heating operation of the heat pump type air conditioner 30, the compressor discharge line heater 40 heats high-temperature and high-pressure refrigerant gas passing through the discharge line of the compressor 31 after being compressed by the compressor 31. The heated refrigerant emerging from the compressor discharge line heater 40 passes through the indoor heat exchanger 33. The compressor discharge line heater 40 may be arranged at a refrigerant conduit between the compressor 31 and the directional valve 32. Alternatively, the compressor discharge line heater 40 may be arranged at a refrigerant conduit between the directional valve 32 and the indoor heat exchanger 33.

The indoor dehumidifying agent body 50 and indoor regeneration heater 58 constitute an indoor dehumidifier 52, which is also included in the indoor unit 46.

The interior of the indoor dehumidifier 52 is partitioned by a barrier 55 to define a dehumidifying chamber 53, through which indoor air I blown toward the indoor heat exchanger 33 passes, and a regeneration chamber 54, through which outdoor air to regenerate the indoor dehumidifying agent body 50 passes.

The indoor dehumidifying agent body 50 extends through the barrier 55 such that a portion of the indoor dehumidifying agent body 50 is arranged in the dehumidifying chamber 53, and the remaining portion of the indoor dehumidifying agent body 50 is arranged in the regeneration chamber 54.

The indoor regeneration heater 58 is arranged in the regeneration chamber 54.

The indoor dehumidifier 52 further includes a driving means 56 such as a motor to rotate the indoor dehumidifying agent body 50 such that the portion of the indoor dehumidifying agent body 50, which is arranged in the dehumidifying chamber 53, is moved to the regeneration chamber 54 after dehumidifying indoor air in the dehumidifying chamber 53 so that the portion of the indoor dehumidifying agent body 50 is dehumidified in the regeneration chamber 54 by the indoor regeneration heater 58.

The indoor dehumidifier 52 further includes a regeneration fan or blower 57 to blow outdoor air O such that the outdoor air O passes through the indoor dehumidifying agent body 50 in a state of being heated by the indoor regeneration heater 58 while passing through the indoor regeneration heater 58, and is then discharged to the atmosphere.

The heat transfer means 60 may be configured to transfer waste heat from only one of the cooling water heat exchanger 12 and exhaust gas heat exchanger 20 to the compressor discharge line heater 40 or indoor regeneration heater 58. Alternatively, the heat transfer means 60 may be configured to transfer waste heat from both the cooling water heat exchanger 12 and the exhaust gas heat exchanger 20 to the compressor discharge line heater 40 or indoor regeneration heater 58. The following description will be given only in conjunction with the case in which the heat transfer means 60 transfers waste heat from both the cooling water heat exchanger 12 and the exhaust gas heat exchanger 20 to the compressor discharge line heater 40 or indoor regeneration heater 58.

The heat transfer means 60 includes a compressor discharge line heater circulation conduit 62 to guide a heat medium to be circulated through the cooling water heat exchanger 12, exhaust gas heat exchanger 20, and compressor discharge line heater 40, and an indoor regeneration heater circulation conduit 64 to guide the heat medium to be circulated through the cooling water heat exchanger 12, exhaust gas heat exchanger 20, and indoor regeneration heater 58.

The compressor discharge line heater circulation conduit 62 and indoor regeneration heater circulation conduit 64 of the heat transfer means 60 may be independent of each other such that a first heat medium is circulated through the compressor discharge line heater circulation conduit 62, and a second heat medium is circulated through the indoor regeneration heater circulation conduit 64. Alternatively, the indoor regeneration heater circulation conduit 64 may be branched from the compressor discharge line heater circulation conduit 62 such that a heat medium is selectively circulated through the compressor discharge line heater circulation conduit 62 or indoor regeneration heater circulation conduit 64. The following description will be given only in conjunction with the case in which the indoor regeneration heater circulation conduit 64 is branched from the compressor discharge line heater circulation conduit 62.

The heat transfer means 60 further includes a heat medium circulation pump 66 to pump the heat medium, and thus, to circulate the heat medium through the compressor discharge line heater circulation conduit 62 or indoor regeneration heater circulation conduit 64.

The heat transfer means 60 further includes a control valve 68 to alternately open/close the compressor discharge line heater circulation conduit 62 and indoor regeneration heater circulation conduit 64.

Although only one control valve 68 is arranged at a connection region where the indoor regeneration heater circulation conduit 64 is branched from the compressor discharge line heater circulation conduit 62, to alternately open/close the compressor discharge line heater circulation conduit 62 and indoor regeneration heater circulation conduit 64, in the illustrated case, two control valves 68 may be arranged at both the compressor discharge line heater circulation conduit 62 and indoor regeneration heater circulation conduit 64, to open/close the conduits 62 and 64 in an independent manner, respectively. The following description will be given only in conjunction with the case in which only one control valve 68 is arranged to alternately open/close the compressor discharge line heater circulation conduit 62 and indoor regeneration heater circulation conduit 64.

The heat transfer means 60 further includes a controller 70 to control the control valve 68 to operate, during a heating operation of the heat pump type air conditioner 30, in a heating mode in which the indoor regeneration heater circulation conduit 64 is closed, and the compressor discharge line heater circulation conduit 62 is opened, and to control the control valve 68 to operate, during a cooling operation of the heat pump type air conditioner 30, in a cooling mode in which the indoor regeneration heater circulation conduit 64 is opened, and the compressor discharge line heater circulation conduit 62 is closed.

The electricity generating and air conditioning system with the dehumidifier according to this embodiment may include a plurality of engines 2 and a plurality of generators 10. Also, a plurality of indoor heat exchangers 33, a plurality of indoor dehumidifying agent bodies 50, and a plurality of indoor regeneration heaters 58 may be used. In addition, the system may include a plurality of compressors 31, a plurality of directional valves 32, a plurality of expansion devices 34, a plurality of compressor discharge line heaters 40, and a plurality of outdoor heat exchangers 35.

Hereinafter, operation of the system having the above-described arrangement will be described.

When fuel is supplied to the engine 2 via the fuel tube 3, and the engine 2 is subsequently driven, the output shaft of the engine 2 is rotated, thereby causing the generator 10 to generate electricity.

During the operation of the engine 2, the cooling water circulation pump 9 operates. In accordance with the operation of the cooling water circulation pump 9, cooling water, which is heated while cooling the engine 2, is fed to the cooling water heat exchanger 12 via the cooling water circulation conduit 7, and is then circulated into the engine 2 via the cooling water circulation conduit 8 after releasing its heat into the cooling water heat exchanger 12.

Exhaust gas, which is discharged from the engine 2 during the operation of the engine 2, is fed to the exhaust gas heat exchanger 20, and is then discharged to the atmosphere after releasing its heat into the exhaust gas heat exchanger 20.

When the heat pump type air conditioner 30 operates in the heating mode, the compressor 31 is driven by the electricity generated from the generator 10. In this case, the directional valve 32 is switched to a heating mode, and the heat medium circulation pump 66 is driven. Also, the control valve 68 is switched to a heating mode.

When the directional valve 32 is switched to the heating mode, and the compressor 31 operates, as shown in FIG. 1, the compressor 31 compresses low-temperature and low-pressure refrigerant gas, thereby changing the refrigerant gas into a high-temperature and high-pressure state. The high-temperature and high-pressure refrigerant gas is fed into the indoor heat exchanger 33 via the directional valve 32, and discharges its heat to indoor air while passing through the indoor heat exchanger 33, so that the refrigerant gas is condensed.

Subsequently, the condensed refrigerant is expanded while passing through the expansion device 34, and is then fed into the outdoor heat exchanger 35. The expanded refrigerant absorbs heat from outdoor air while passing through the outdoor heat exchanger 35, so that the refrigerant is evaporated.

The evaporated refrigerant is subsequently circulated into the compressor 31 via the directional valve 32. As the circulation of the refrigerant is repeated, a confined space, in which indoor air is circulated, is continuously heated.

When the control valve 68 is switched to the heating mode, and the heat medium circulation pump 66 is driven, the heat medium heated by the cooling water heat exchanger 12 is re-heated by the exhaust gas heat exchanger 20, and is then guided to the compressor discharge line heater circulation conduit 62, and thus, the compressor discharge line heater 40, by the control valve 68. After releasing heat into the compressor discharge line heater 40, that is, heating the compressor discharge line heater 40, the heat medium is circulated into the cooling water heat exchanger 12. As the circulation of the heat medium is repeated, the compressor discharge line heater 40 is continuously heated.

Meanwhile, the compressor discharge line heater 40, which is heated as described above, heats a refrigerant fed to the indoor heat exchanger 33. As a result, the heated refrigerant increases the indoor temperature over the case in which the refrigerant is not heated by the compressor discharge line heater 40.

On the other hand, when the heat pump type air conditioner operates in a cooling mode, the compressor 31 is driven by the electricity generated from the generator 10. In this case, the directional valve 32 is switched to the cooling mode, and the heat medium circulation pump 66 is driven. Also, the control valve 68 is switched to the cooling mode, and the indoor dehumidifier 52 is driven.

When the directional valve 32 is switched to the cooling mode, and the compressor 31 operates, as shown in FIG. 2, the compressor 31 compresses low-temperature and low-pressure refrigerant gas, thereby changing the refrigerant gas into a high-temperature and high-pressure state. The high-temperature and high-pressure refrigerant gas is fed into the outdoor heat exchanger 35 via the directional valve 32, and discharges its heat to outdoor air while passing through the outdoor heat exchanger 35, so that the refrigerant gas is condensed.

Subsequently, the condensed refrigerant is expanded while passing through the expansion device 34, and is then fed into the indoor heat exchanger 33. The expanded refrigerant absorbs heat from indoor air I while passing through the indoor heat exchanger 33, so that the refrigerant is evaporated.

The evaporated refrigerant is circulated into the compressor 31 via the directional valve 32. As the circulation of the refrigerant is repeated, the confined space is continuously cooled.

Meanwhile, when the control valve 68 is switched to the cooling mode, and the heat medium circulation pump 66 operates, the heat medium heated by the cooling water heat exchanger 12 is re-heated by the exhaust gas heat exchanger 20, and is then guided to the indoor regeneration heater circulation conduit 64, and thus, the indoor regeneration heater 58, by the control valve 68. After releasing heat into the indoor regeneration heater 58, that is, heating the indoor regeneration heater 58, the heat medium is circulated into the cooling water heat exchanger 12. As the circulation of the heat medium is repeated, the indoor regeneration heater 58 is continuously heated.

When the indoor dehumidifier 52 is to be driven, the driving means 56 such as a motor rotates the indoor dehumidifying agent body 50 while driving the regeneration blower 57.

During the operation of the regeneration blower 57, outdoor air O is heated by the indoor regeneration heater 58. The heated outdoor air O regenerates the indoor dehumidifying agent body 50 while passing through the indoor dehumidifying agent body 50, and is then discharged to the atmosphere.

Figure 3:
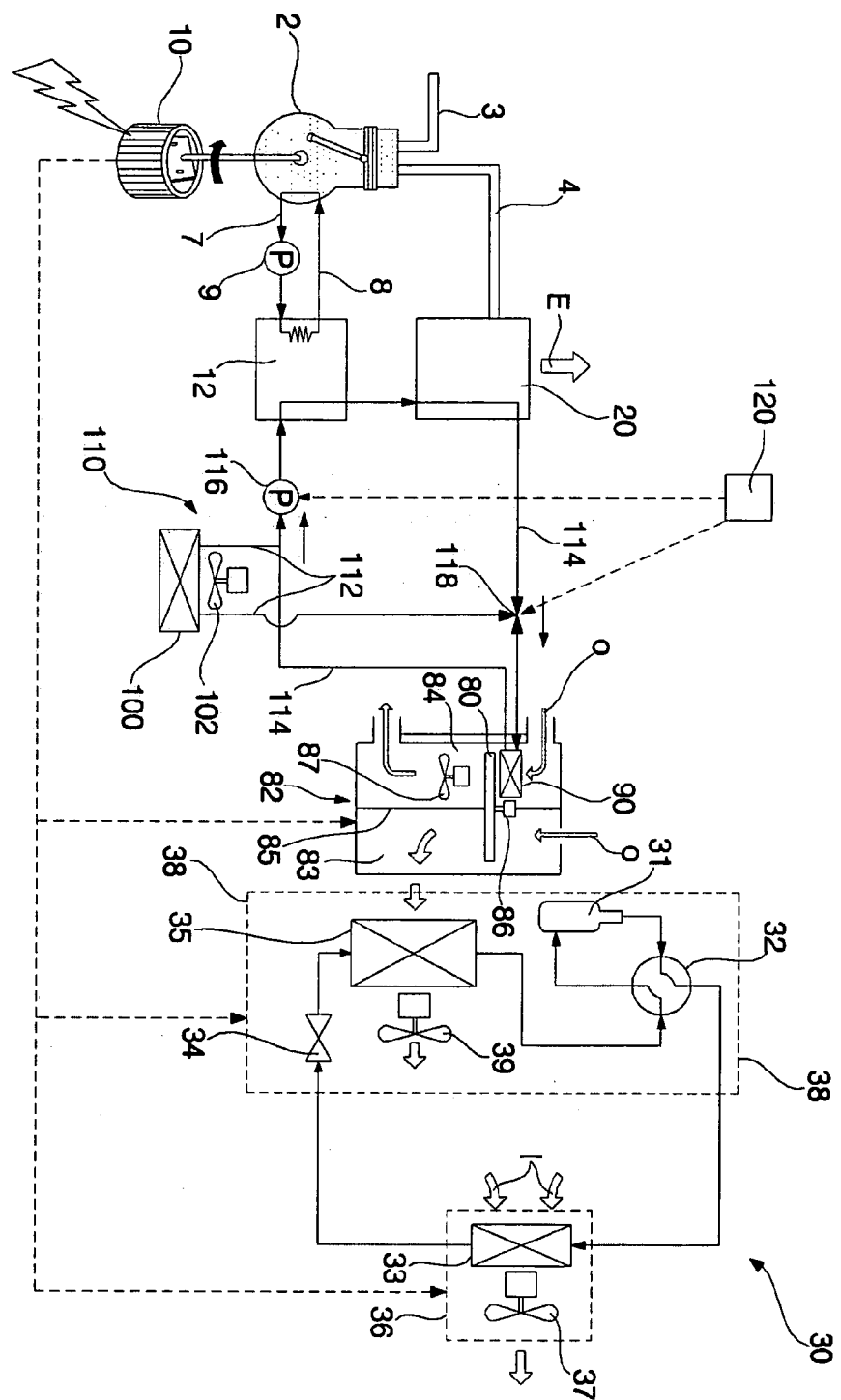
FIG. 3 is a schematic diagram of an electricity generating and air conditioning system with a dehumidifier according to a second embodiment of the present invention, illustrating a state in which the system operates in a heating mode.
Figure 4:
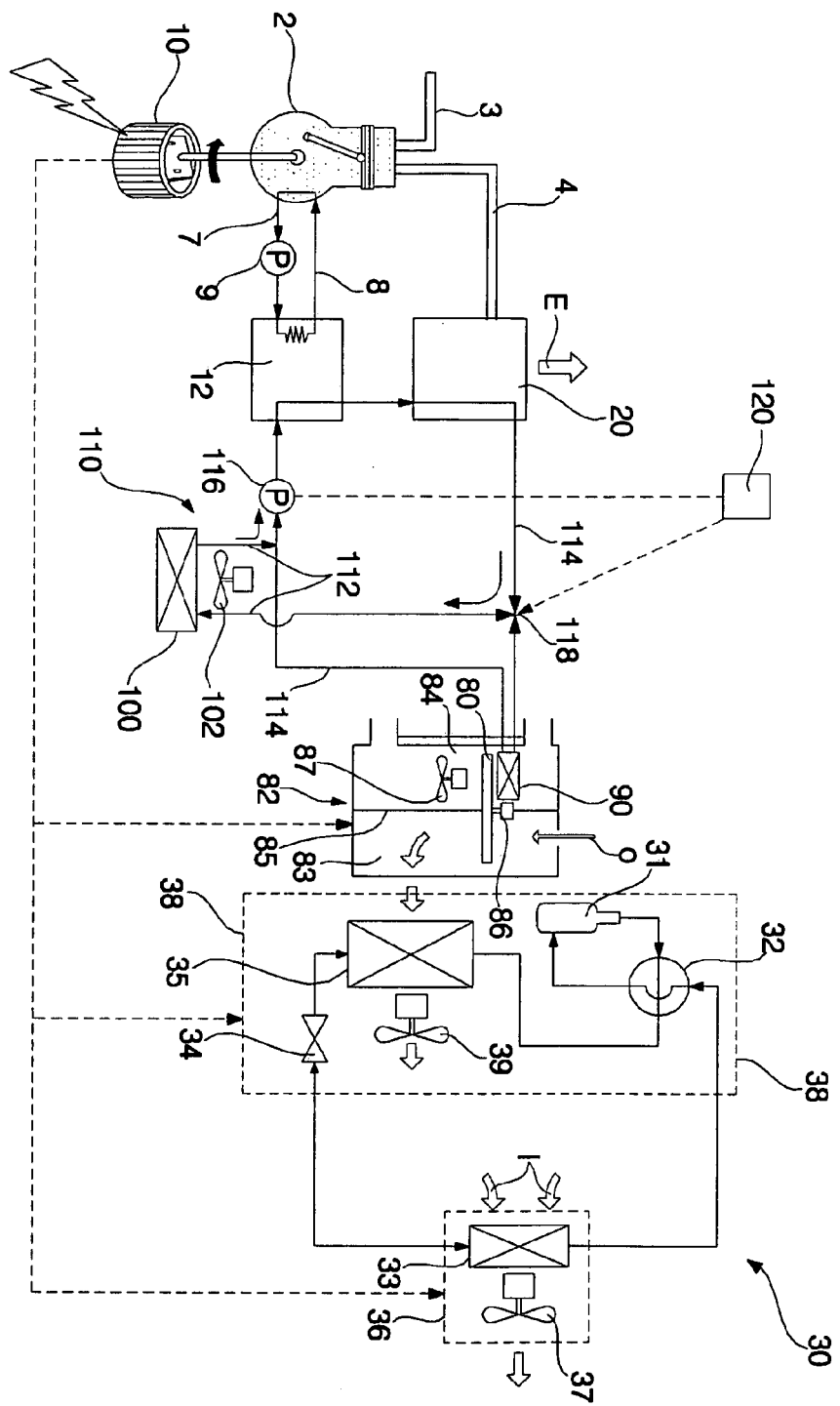
FIG. 4 is a schematic diagram of the electricity generating and air conditioning system with the dehumidifier according to the second embodiment of the present invention, illustrating a state in which the system operates in a cooling mode.

FIG. 3 is a schematic diagram of an electricity generating and air conditioning system with a dehumidifier according to a second embodiment of the present invention, illustrating a state in which the system operates in a heating mode. FIG. 4 is a schematic diagram of the electricity generating and air conditioning system with the dehumidifier according to the second embodiment of the present invention, illustrating a state in which the system operates in a cooling mode.

As shown in FIGS. 3 and 4, the electricity generating and air conditioning system includes an engine 2, a generator 10 connected to an output shaft of the engine 2 to generate electricity, a cooling water heat exchanger 12 to absorb heat from cooling water used to cool the engine 2, and an exhaust gas heat exchanger 20 to absorb heat from exhaust gas discharged from the engine 2. The electricity generating and air conditioning system also includes a heat pump type air conditioner 30, which uses the electricity generated from the generator 10, and includes a compressor 31, a directional valve 32, an indoor heat exchanger 33, an expansion device 34, and an outdoor heat exchanger 35. The electricity generating and air conditioning system further includes an outdoor dehumidifying agent body 80 to pre-heat outdoor air blown to the outdoor heat exchanger 35, an outdoor regeneration heater 90 to regenerate the outdoor dehumidifying agent body 80, a radiating heat exchanger 100 to radiate heat from at least one of the cooling water heat exchanger 12 and exhaust gas heat exchanger 20, and a heat transfer means 110 to transfer heat from at least one of the cooling water heat exchanger 12 and exhaust gas heat exchanger 20 to the outdoor regeneration heater 90 during a heating operation of the heat pump type air conditioner 30 and to transfer heat from at least one of the cooling water heat exchanger 12 and exhaust gas heat exchanger 20 to the radiating heat exchanger 100 during a cooling operation of the heat pump type air conditioner 30.

The configurations and functions of the engine 2, generator 10, cooling water heat exchanger 12, exhaust gas heat exchanger 20, compressor 31, directional valve 32, indoor heat exchanger 33, expansion device 34, and outdoor heat exchanger 35 are the same as those of the first embodiment. Accordingly, these elements are designated by the same reference numerals as those of the first embodiment, and no detailed description thereof will be given.

The heat pump type air conditioner 30 further includes an indoor fan or blower 37 to blow indoor air I to the indoor heat exchanger 33. The indoor heat exchanger 33 and indoor fan 37 constitute an indoor unit 36 of the heat pump type air conditioner 30.

The heat pump type air conditioner 30 further includes an outdoor fan or blower 39 to blow outdoor air O to the outdoor heat exchanger 35. The compressor 31, directional valve 32, expansion device 34, outdoor heat exchanger 35, and outdoor fan 39 constitute an outdoor unit 38 of the heat pump type air conditioner 30.

The outdoor dehumidifying agent body 80 and outdoor regeneration heater 90 constitute an outdoor dehumidifier 82. The outdoor dehumidifier 82 is arranged upstream from the outdoor heat exchanger 35 with respect to a flowing direction of outdoor air O blown to the outdoor heat exchanger 35, in order to dehumidify the outdoor air O, and thus, to prevent the outdoor heat exchanger 35 from being frosted.

The interior of the outdoor dehumidifier 82 is partitioned by a barrier 85 to define a dehumidifying chamber 83, through which outdoor air O blown toward the outdoor heat exchanger 35 passes, and a regeneration chamber 84, through which outdoor air O to regenerate the outdoor dehumidifying agent body 80 passes.

The outdoor dehumidifying agent body 80 extends through the barrier 85 such that a portion of the outdoor dehumidifying agent body 80 is arranged in the dehumidifying chamber 83, and the remaining portion of the outdoor dehumidifying agent body 80 is arranged in the regeneration chamber 84.

The outdoor regeneration heater 90 is arranged in the regeneration chamber 84.

The outdoor dehumidifier 82 further includes a driving means 86 such as a motor to rotate the outdoor dehumidifying agent body 80 such that the portion of the outdoor dehumidifying agent body 80, which is arranged in the dehumidifying chamber 83, is moved to the regeneration chamber 84 after dehumidifying indoor air in the dehumidifying chamber 83 so that the portion of the outdoor dehumidifying agent body 80 is dehumidified in the regeneration chamber 84 by the outdoor regeneration heater 90.

The outdoor dehumidifier 82 further includes a regeneration fan or blower 87 to blow outdoor air O such that the outdoor air O passes through the outdoor dehumidifying agent body 80 in a state of being heated by the outdoor regeneration heater 90 while passing through the outdoor regeneration heater 90, and is then discharged to the atmosphere.

The heat transfer means 110 may be configured to transfer waste heat from only one of the cooling water heat exchanger 12 and exhaust gas heat exchanger 20 to the outdoor regeneration heater 90 or radiating heat exchanger 100. Alternatively, the heat transfer means 110 may be configured to transfer waste heat from both the cooling water heat exchanger 12 and the exhaust gas heat exchanger 20 to the outdoor regeneration heater 90 or radiating heat exchanger 100. The following description will be given only in conjunction with the case in which the heat transfer means 110 transfers waste heat from both the cooling water heat exchanger 12 and the exhaust gas heat exchanger 20 to the outdoor regeneration heater 90 or radiating heat exchanger 100.

The heat transfer means 110 includes a radiating heat exchanger circulation conduit 112 to guide a heat medium to be circulated through the cooling water heat exchanger 12, exhaust gas heat exchanger 20, and radiating heat exchanger 40, and an outdoor regeneration heater circulation conduit 114 to guide the heat medium to be circulated through the cooling water heat exchanger 12, exhaust gas heat exchanger 20, and outdoor regeneration heater 90.

The radiating heat exchanger circulation conduit 112 and outdoor regeneration heater circulation conduit 114 of the heat transfer means 110 may be independent of each other such that a first heat medium is circulated through the radiating heat exchanger circulation conduit 112, and a second heat medium is circulated through the outdoor regeneration heater circulation conduit 114. Alternatively, the outdoor regeneration heater circulation conduit 114 may be branched from the radiating heat exchanger circulation conduit 112 such that a heat medium is selectively circulated through the radiating heat exchanger circulation conduit 112 or outdoor regeneration heater circulation conduit 114. The following description will be given only in conjunction with the case in which the outdoor regeneration heater circulation conduit 114 is branched from the radiating heat exchanger circulation conduit 112.

The heat transfer means 110 further includes a heat medium circulation pump 116 to pump the heat medium, and thus, to circulate the heat medium through the radiating heat exchanger circulation conduit 112 or outdoor regeneration heater circulation conduit 114.

The heat transfer means 110 further includes a control valve 118 to alternately open/close the radiating heat exchanger circulation conduit 112 and outdoor regeneration heater circulation conduit 114.

Although only one control valve 118 is arranged at a connection region where the outdoor regeneration heater circulation conduit 114 is branched from the radiating heat exchanger circulation conduit 112, to alternately open/close the radiating heat exchanger circulation conduit 112 and outdoor regeneration heater circulation conduit 114, in the illustrated case, two control valves 118 may be arranged at both the radiating heat exchanger circulation conduit 112 and outdoor regeneration heater circulation conduit 114, to open/close the conduits 112 and 114 in an independent manner, respectively. The following description will be given only in conjunction with the case in which only one control valve 118 is arranged to alternately open/close the radiating heat exchanger circulation conduit 112 and outdoor regeneration heater circulation conduit 114.

The heat transfer means 110 further includes a controller 120 to control the control valve 118 to operate, during a heating operation of the heat pump type air conditioner 30, in a heating mode in which the radiating heat exchanger circulation conduit 112 is closed, and the outdoor regeneration heater circulation conduit 114 is opened, and to control the control valve 118 to operate, during a cooling operation of the heat pump type air conditioner 30, in a cooling mode in which the radiating heat exchanger circulation conduit 112 is opened, and the outdoor regeneration heater circulation conduit 114 is closed.

The electricity generating and air conditioning system with the dehumidifier according to this embodiment may include a plurality of engines 2 and a plurality of generators 10. Also, a plurality of indoor heat exchangers 33 may be used. In addition, the system may include a plurality of compressors 31, a plurality of directional valves 32, a plurality of expansion devices 34, a plurality of outdoor heat exchangers 35, and a plurality of outdoor dehumidifiers 82.

Reference numeral 102 designates a radiating fan to blow outdoor air to the radiating heat exchanger 110.

Hereinafter, operation of the system having the above-described arrangement will be described.

When the heat pump type air conditioner 30 operates in a heating mode, the compressor 31 is driven by the electricity generated from the generator 10. In this case, the directional valve 32 is switched to a heating mode, and the heat medium circulation pump 116 is driven. Also, the control valve 118 is switched to a heating mode, and the outdoor dehumidifier 82 operates.

When the control valve 118 is switched to the heating mode, and the heat medium circulation pump 116 operates, as shown in FIG. 3, the heat medium heated by the cooling water heat exchanger 12 is re-heated by the exhaust gas heat exchanger 20, and is then guided to the outdoor regeneration heater circulation conduit 114, and thus, the outdoor regeneration heater 90, by the control valve 118. After releasing heat into the outdoor regeneration heater 90, that is, heating the outdoor regeneration heater 90, the heat medium is circulated into the cooling water heat exchanger 12. As the circulation of the heat medium is repeated, the outdoor regeneration heater 90 is continuously heated.

When the outdoor dehumidifier 82 is to be driven, the driving means 86 such as a motor rotates the outdoor dehumidifying agent body 80 while driving the regeneration blower 87.

During the operation of the regeneration blower 87, outdoor air O is heated by the outdoor regeneration heater 90. The heated outdoor air O regenerates the outdoor dehumidifying agent body 80 while passing through the outdoor dehumidifying agent body 80, and is then discharged to the atmosphere.

That is, the outdoor dehumidifier 82 dehumidifies the outdoor air O blown to the outdoor heat exchanger 35, using the waste heat of the cooling water heat exchanger 12 and exhaust gas heat exchanger 20 as a heat source, thereby preventing the outdoor heat exchanger 35 from being frosted.

On the other hand, when the heat pump type air conditioner 30 operates in a cooling mode, the compressor 31 is driven by the electricity generated from the generator 10. In this case, the directional valve 32 is switched to a cooling mode, and the heat medium circulation pump 116 is driven. Also, the control valve 118 is switched to a cooling mode, and the radiating fan 102 is driven.

When the control valve 118 is switched to the cooling mode, and the heat medium circulation pump 116 is driven, as shown in FIG. 4, the heat medium heated by the cooling water heat exchanger 12 is re-heated by the exhaust gas heat exchanger 20, and is then guided to the radiating heat exchanger circulation conduit 112, and thus, the radiating heat exchanger 100, by the control valve 118. After transferring waste heat to the radiating heat exchanger 100, the heat medium is circulated into the cooling water heat exchanger 12.

As the circulation of the heat medium is repeated, the waste heat of the cooling water heat exchanger 12 and exhaust gas heat exchanger 20 is discharged to the atmosphere through the radiating heat exchanger 100.

Figure 5:
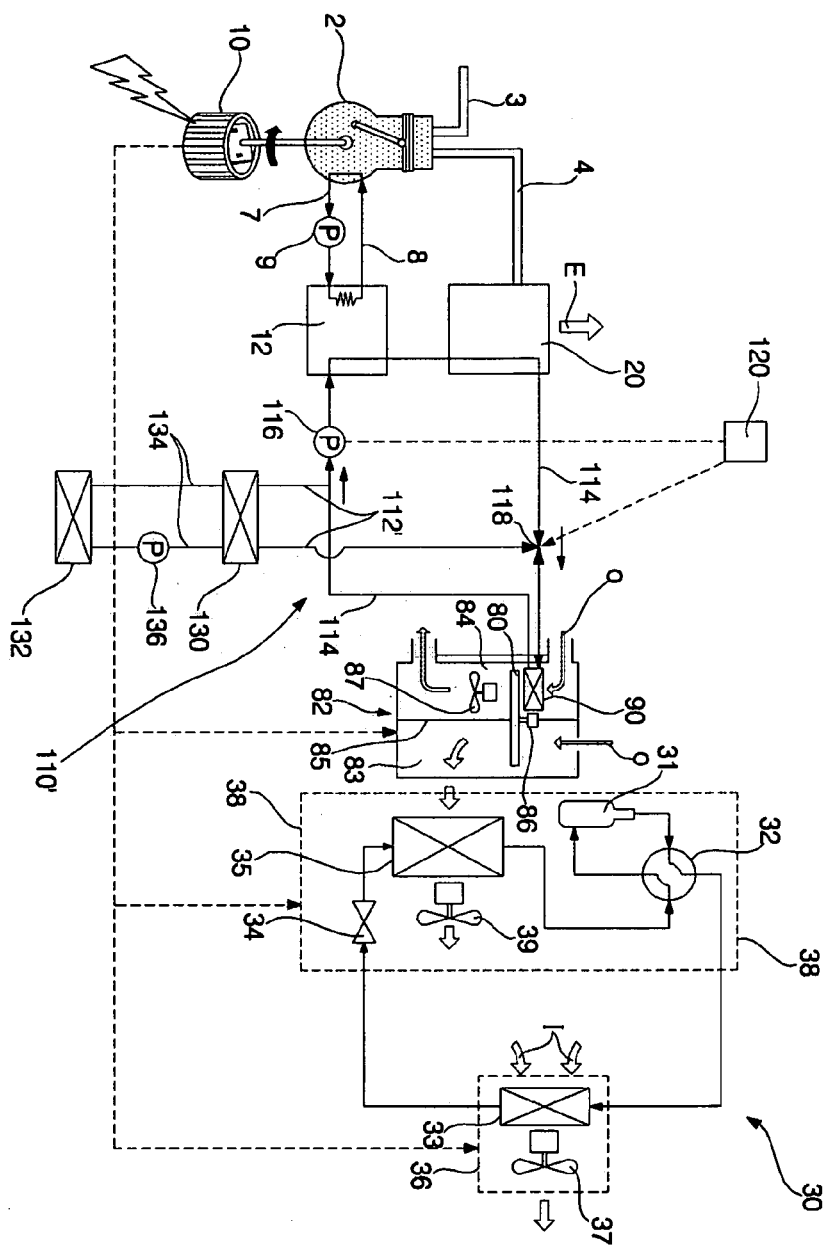
FIG. 5 is a schematic diagram of an electricity generating and air conditioning system with a dehumidifier according to a third embodiment of the present invention, illustrating a state in which the system operates in a heating mode.
Figure 6:
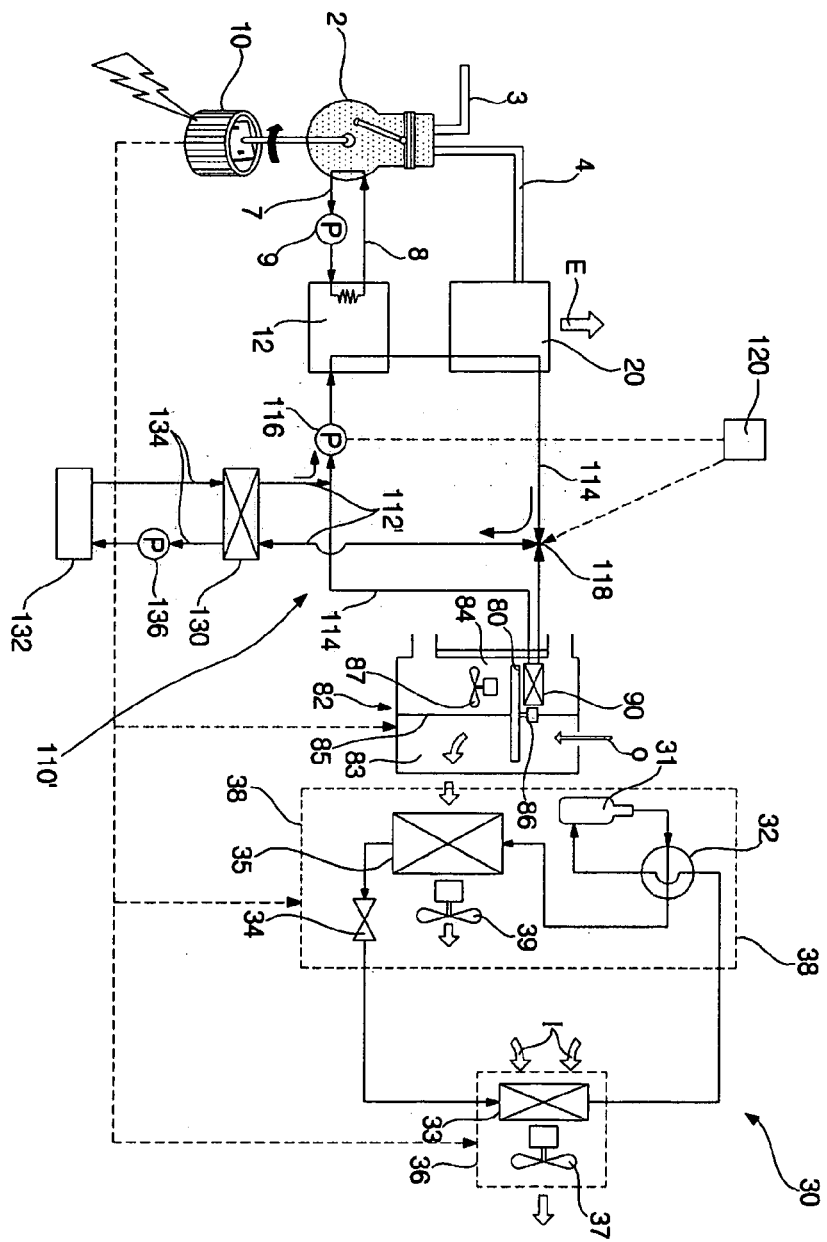
FIG. 6 is a schematic diagram of the electricity generating and air conditioning system with the dehumidifier according to the third embodiment of the present invention, illustrating a state in which the system operates in a cooling mode.

FIG. 5 is a schematic diagram of an electricity generating and air conditioning system with a dehumidifier according to a third embodiment of the present invention, illustrating a state in which the system operates in a heating mode. FIG. 6 is a schematic diagram of the electricity generating and air conditioning system with the dehumidifier according to the third embodiment of the present invention, illustrating a state in which the system operates in a cooling mode.

As shown in FIGS. 5 and 6, the electricity generating and air conditioning system includes an engine 2, a generator 10 connected to an output shaft of the engine 2 to generate electricity, a cooling water heat exchanger 12 to absorb heat from cooling water used to cool the engine 2, and an exhaust gas heat exchanger 20 to absorb heat from exhaust gas discharged from the engine 2. The electricity generating and air conditioning system also includes a heat pump type air conditioner 30, which uses the electricity generated from the generator 10, and includes a compressor 31, a directional valve 32, an indoor heat exchanger 33, an expansion device 34, and an outdoor heat exchanger 35. The electricity generating and air conditioning system further includes an outdoor dehumidifying agent body 80 to pre-heat outdoor air blown to the outdoor heat exchanger 35, an outdoor regeneration heater 90 to regenerate the outdoor dehumidifying agent body 80, a water-heating heat exchanger 130 to radiate heat from at least one of the cooling water heat exchanger 12 and exhaust gas heat exchanger 20, and a heat transfer means 110' to transfer heat from at least one of the cooling water heat exchanger 12 and exhaust gas heat exchanger 20 to the outdoor regeneration heater 90 during a heating operation of the heat pump type air conditioner 30 and to transfer heat from at least one of the cooling water heat exchanger 12 and exhaust gas heat exchanger 20 to the water-heating heat exchanger 130 during a cooling operation of the heat pump type air conditioner 30.

The electricity generating and air conditioning system according to this embodiment has the same configurations and functions as those of the second embodiment in terms of the engine 2, generator 10, cooling water heat exchanger 12, exhaust gas heat exchanger 20, heat pump type air conditioner 30, outdoor dehumidifier 80, and outdoor regeneration heater 90, except for the water-heating heat exchanger 130 and heat transfer means 110'. Accordingly, the elements of the third embodiment respectively corresponding to those of the second embodiment are designated by the same reference numerals, respectively, and no detailed description thereof will be given.

The water-heating heat exchanger 130 is connected to a hot water consumer 130, which uses hot water, via a hot water conduit 134.

A hot water pump 136 is arranged at one of the water-heating heat exchanger 130, hot water consumer 132, and hot water conduit 134, to circulate or supply water heated by the water-heating heat exchanger 130 into the hot water consumer 132.

The heat transfer means 110' includes a water-heating heat exchanger circulation conduit 112', in place of the radiating heat exchanger circulation conduit 112 of the second embodiment. The heat transfer means 110' has the same configuration as that of the second embodiment in terms of the outdoor regeneration heater circulation conduit 114, heat medium circulation pump 116, and control valve 118, except for the water-heating heat exchanger circulation conduit 112'. Accordingly, the elements of the heat transfer means 110' respectively corresponding to those of the second embodiment are designated by the same reference numerals, respectively, and no detailed description thereof will be given.

Hereinafter, operation of the system having the above-described arrangement will be described.

When the heat pump type air conditioner 30 operates in a heating mode, as shown in FIG. 5, the compressor 31 is driven by the electricity generated from the generator 10, as in the second embodiment. In this case, the directional valve 32 is switched to a heating mode, and the heat medium circulation pump 116 is driven. Also, the control valve 118 is switched to a heating mode, and the outdoor dehumidifier 82 operates.

The circulation of the refrigerant and heat medium according to the above-described driving and switching operations and the operation of preventing the outdoor heat exchanger 35 from being frosted are achieved in the same manner as in the second embodiment. Accordingly, no detailed description will be given.

On the other hand, when the heat pump type air conditioner 30 operates in a cooling mode, as shown in FIG. 6, the compressor 31 is driven by the electricity generated from the generator 10. In this case, the directional valve 32 is switched to a cooling mode, and the heat medium circulation pump 116 is driven. Also, the control valve 118 is switched to a cooling mode.

When the control valve 118 is switched to the cooling mode, and the heat medium circulation pump 116 is driven, the heat medium heated by the cooling water heat exchanger 12 is re-heated by the exhaust gas heat exchanger 20, and is then guided to the water-heating heat exchanger circulation conduit 112', and thus, the water-heating heat exchanger 130, by the control valve 118. After transferring waste heat to the water-heating heat exchanger 130, the heat medium is circulated into the cooling water heat exchanger 12.

As the circulation of the heat medium is repeated, the water-heating heat exchanger 130 is continuously heated. When the hot water pump 136 is driven under this condition, hot water is supplied to the hot water consumer 132.

Figure 7:
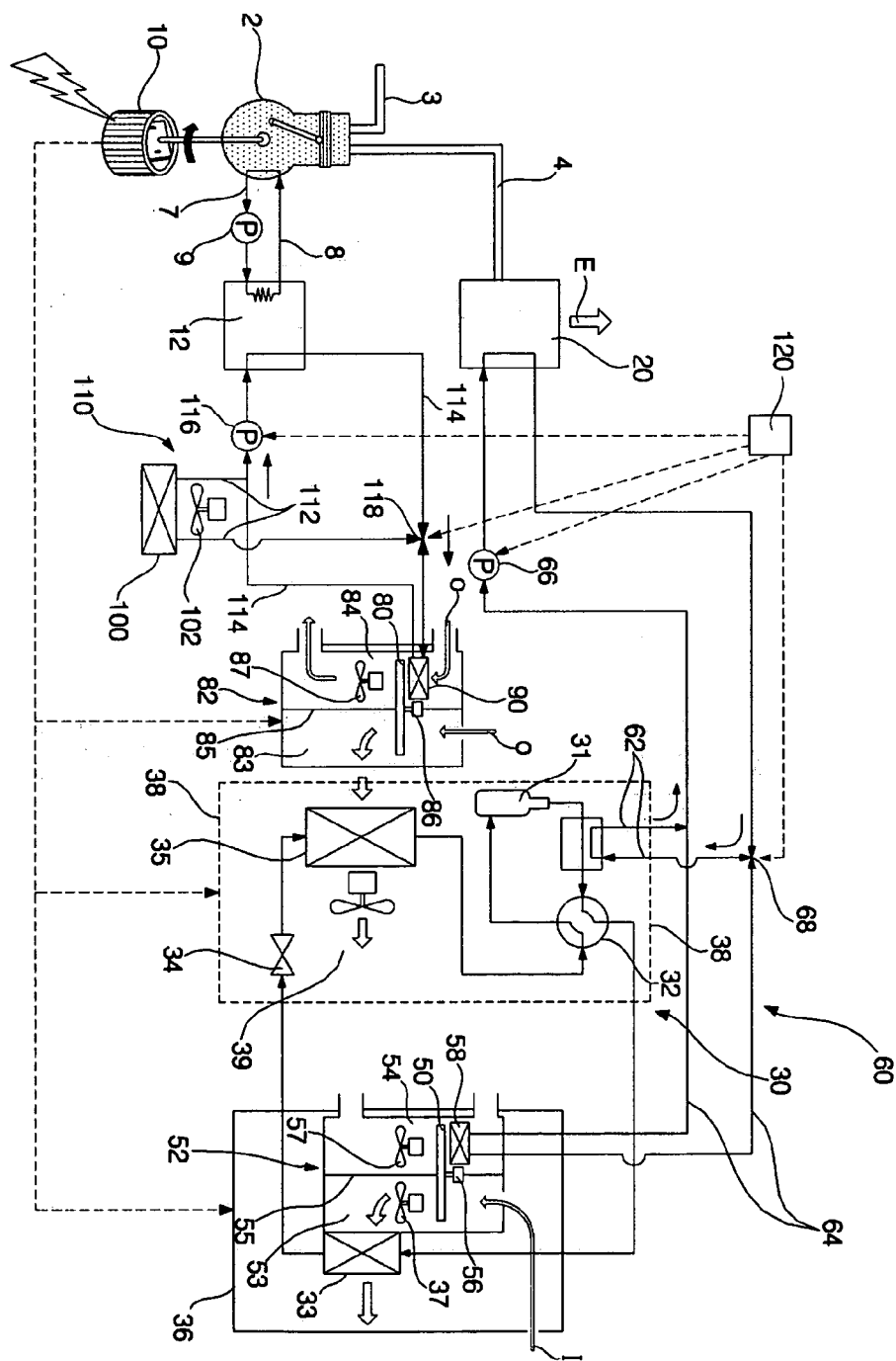
FIG. 7 is a schematic diagram of an electricity generating and air conditioning system with a dehumidifier according to a fourth embodiment of the present invention, illustrating a state in which the system operates in a heating mode.
Figure 8:
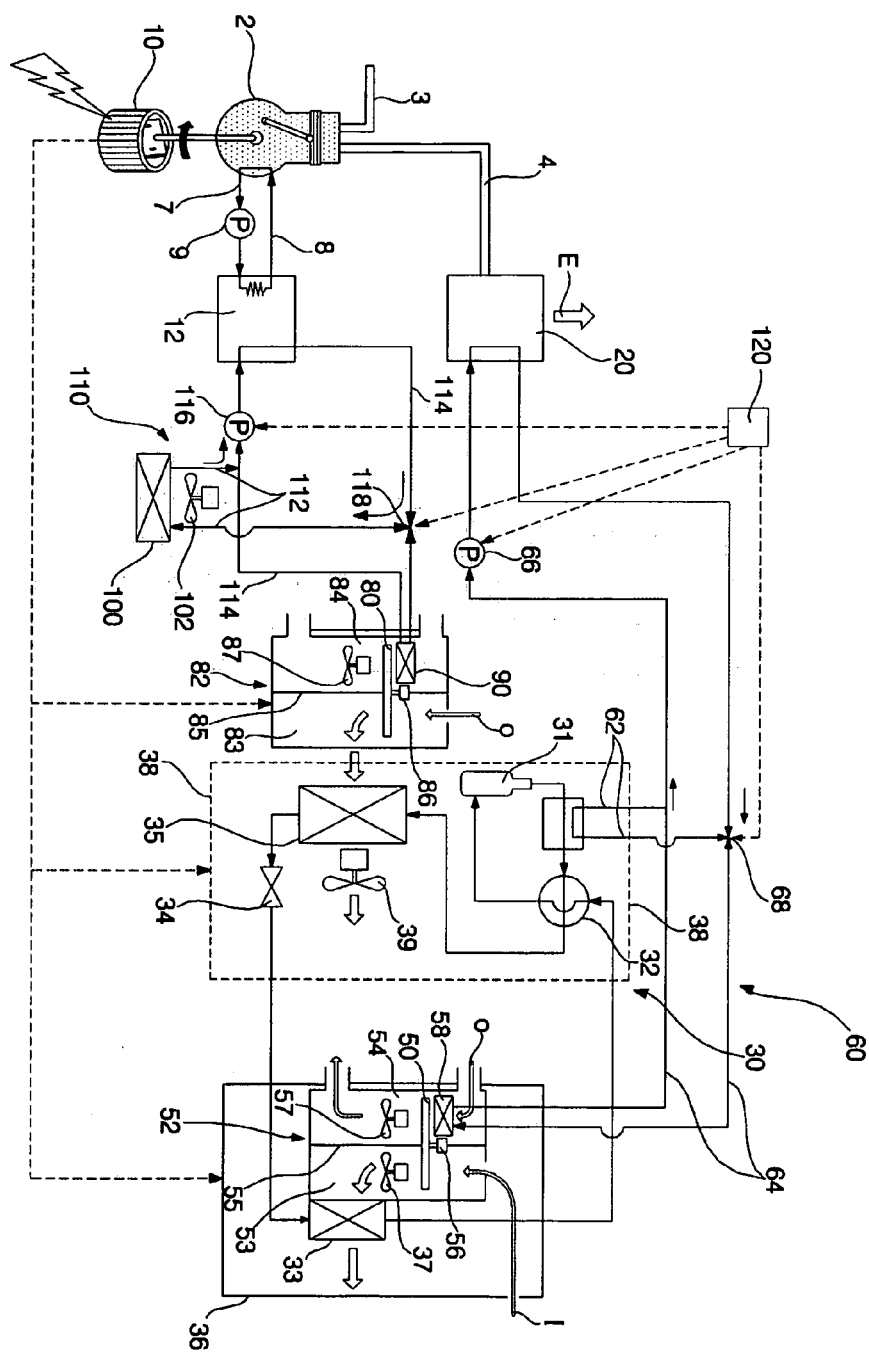
FIG. 8 is a schematic diagram of the electricity generating and air conditioning system with the dehumidifier according to the fourth embodiment of the present invention, illustrating a state in which the system operates in a cooling mode.

FIG. 7 is a schematic diagram of an electricity generating and air conditioning system with a dehumidifier according to a fourth embodiment of the present invention, illustrating a state in which the system operates in a heating mode. FIG. 8 is a schematic diagram of the electricity generating and air conditioning system with the dehumidifier according to the fourth embodiment of the present invention, illustrating a state in which the system operates in a cooling mode.

As shown in FIGS. 7 and 8, the electricity generating and air conditioning system includes an engine 2, a generator 10 connected to an output shaft of the engine 2 to generate electricity, a cooling water heat exchanger 12 to absorb heat from cooling water used to cool the engine 2, and an exhaust gas heat exchanger 20 to absorb heat from exhaust gas discharged from the engine 2. The electricity generating and air conditioning system also includes a heat pump type air conditioner 30, which uses the electricity generated from the generator 10, and includes a compressor 31, a directional valve 32, an indoor heat exchanger 33, an expansion device 34, and an outdoor heat exchanger 35. The electricity generating and air conditioning system further includes a compressor discharge line heater 40 to heat a discharge line of the compressor 31, an indoor dehumidifying agent body 50 to dehumidify indoor air I, an indoor regeneration heater 58 to regenerate the indoor dehumidifying agent body 50, and a first heat transfer means 60 to transfer heat from at least one of the cooling water heat exchanger 12 and exhaust gas heat exchanger 20 to the compressor discharge line heater 40 during a heating operation of the heat pump type air conditioner 30 and to transfer heat from at least one of the cooling water heat exchanger 12 and exhaust gas heat exchanger 20 to the indoor regeneration heater 58 during a cooling operation of the heat pump type air conditioner 30. The electricity generating and air conditioning system further includes an outdoor dehumidifying agent body 80 to pre-heat outdoor air blown to the outdoor heat exchanger 35, an outdoor regeneration heater 90 to regenerate the outdoor dehumidifying agent body 80, a radiating heat exchanger 100 to radiate heat from at least one of the cooling water heat exchanger 12 and exhaust gas heat exchanger 20, and a second heat transfer means 110 to transfer heat from at least one of the cooling water heat exchanger 12 and exhaust gas heat exchanger 20 to the outdoor regeneration heater 90 during the heating operation of the heat pump type air conditioner 30 and to transfer heat from at least one of the cooling water heat exchanger 12 and exhaust gas heat exchanger 20 to the radiating heat exchanger 100 during the cooling operation of the heat pump type air conditioner 30.

The configurations and functions of the engine 2, generator 10, cooling water heat exchanger 12, exhaust gas heat exchanger 20, heat pump type air conditioner 30, compressor discharge line heater 40, indoor dehumidifier 50, and indoor regeneration heater 58 are the same as those of the first embodiment. Accordingly, these elements are designated by the same reference numerals as those of the first embodiment, and no detailed description thereof will be given.

Also, the outdoor dehumidifying agent body 80, outdoor regeneration heater 90, and radiating heat exchanger 100 are the same as those of the second embodiment. Accordingly, these elements are designated by the same reference numerals as those of the second embodiment, and no detailed description thereof will be given.

The first heat transfer means 60 transfers heat from one of the cooling water heat exchanger 12 and exhaust gas heat exchanger 20, for example, the exhaust gas heat exchanger 20, to the compressor discharge line heater 40 or indoor regeneration heater 58.

The following description will be given only in conjunction with the case in which the first heat transfer means 60 transfers the heat of the exhaust gas heat exchanger 20. Since other configurations and functions of the first heat transfer means 60 are the same as those of the first embodiment, elements of the first heat transfer means 60 respectively corresponding to those of the first embodiment are designated by the same reference numerals, and no detailed description thereof will be given.

The second heat transfer means 110 transfers heat from the other one of the cooling water heat exchanger 12 and exhaust gas heat exchanger 20, for example, the cooling water heat exchanger 12, to the outdoor regeneration heater 90 or radiating heat exchanger 100.

The following description will be given only in conjunction with the case in which the second heat transfer means 110 transfers the heat of the cooling water heat exchanger 12. Since other configurations and functions of the second heat transfer means 110 are the same as those of the second embodiment, elements of the second heat transfer means 110 respectively corresponding to those of the second embodiment are designated by the same reference numerals, and no detailed description thereof will be given.

Hereinafter, operation of the system having the above-described arrangement will be described.

When the heat pump type air conditioner 30 operates in a heating mode, the compressor 31 is driven by the electricity generated from the generator 10. In this case, the directional valve 32 is switched to a heating mode, and the heat medium circulation pump 66 is driven. The control valve 38 is also switched to a heating mode.

Also, the heat medium circulation pump 116 is driven, the control valve 118 is switched to a heating mode, and the outdoor dehumidifier 82 operates.

In accordance with the switching operations to the heating mode and driving operations, the compressor discharge line heater 40 is heated by the waste heat of the exhaust gas heat exchanger 20, so that high-temperature and high-pressure refrigerant gas is changed to a higher-temperature state. As a result, the heating performance of the indoor heat exchanger 33 is enhanced. The waste heat of the cooling water heat exchanger 12 is used as a heat source for the outdoor regeneration heater 90, thereby preventing the outdoor heat exchanger 35 from being frosted.

On the other hand, when the heat pump type air conditioner 30 operates in a cooling mode, the compressor 31 is driven by the electricity generated from the generator 10. In this case, the directional valve 32 is switched to a cooling mode, and the heat medium circulation pump 66 is driven. The control valve 38 is also switched to a cooling mode.

Also, the heat medium circulation pump 116 is driven, and the control valve 118 is switched to a cooling mode.

In accordance with the switching operations to the cooling mode and driving operations, the waste heat of the exhaust gas heat exchanger 20 is used as a heat source for the indoor regeneration heater 58, thereby enhancing the pleasantness of a confined space to be cooled. Meanwhile, the waste heat of the cooling water heat exchanger 12 is discharged to the atmosphere through the radiating heat exchanger 100.

Figure 9:
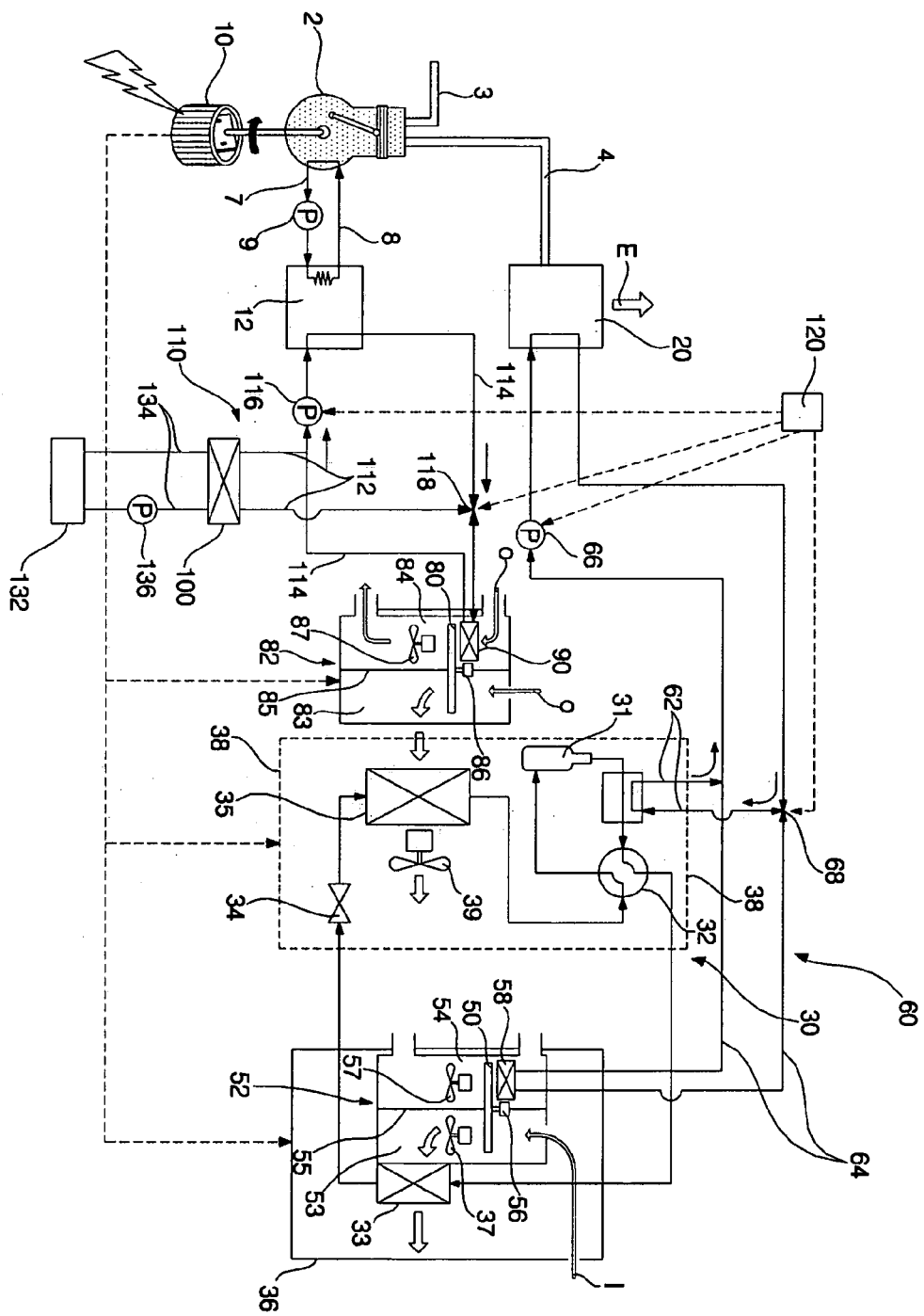
FIG. 9 is a schematic diagram of an electricity generating and air conditioning system with a dehumidifier according to a fifth embodiment of the present invention, illustrating a state in which the system operates in a heating mode.
Figure 10:
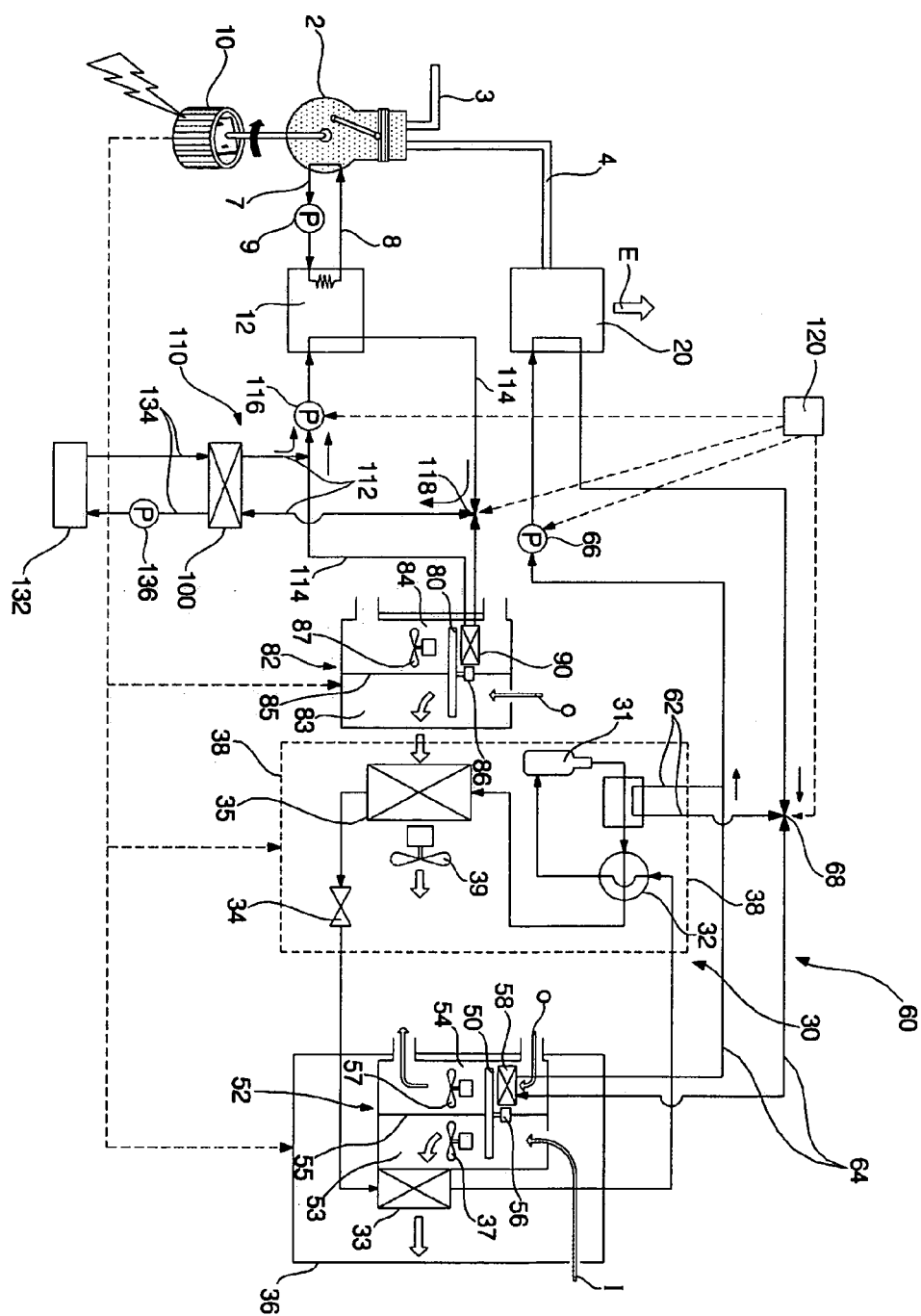
FIG. 10 is a schematic diagram of the electricity generating and air conditioning system with the dehumidifier according to the fifth embodiment of the present invention, illustrating a state in which the system operates in a cooling mode.

FIG. 9 is a schematic diagram of an electricity generating and air conditioning system with a dehumidifier according to a fifth embodiment of the present invention, illustrating a state in which the system operates in a heating mode. FIG. 10 is a schematic diagram of the electricity generating and air conditioning system with the dehumidifier according to the fifth embodiment of the present invention, illustrating a state in which the system operates in a cooling mode.

As shown in FIGS. 9 and 10, the electricity generating and air conditioning system includes an engine 2, a generator 10 connected to an output shaft of the engine 2 to generate electricity, a cooling water heat exchanger 12 to absorb heat from cooling water used to cool the engine 2, and an exhaust gas heat exchanger 20 to absorb heat from exhaust gas discharged from the engine 2. The electricity generating and air conditioning system also includes a heat pump type air conditioner 30, which uses the electricity generated from the generator 10, and includes a compressor 31, a directional valve 32, an indoor heat exchanger 33, an expansion device 34, and an outdoor heat exchanger 35. The electricity generating and air conditioning system further includes a compressor discharge line heater 40 to heat a discharge line of the compressor 31, an indoor dehumidifying agent body 50 to dehumidify indoor air I, an indoor regeneration heater 58 to regenerate the indoor dehumidifying agent body 50, and a first heat transfer means 60 to transfer heat from at least one of the cooling water heat exchanger 12 and exhaust gas heat exchanger 20 to the compressor discharge line heater 40 during a heating operation of the heat pump type air conditioner 30 and to transfer heat from at least one of the cooling water heat exchanger 12 and exhaust gas heat exchanger 20 to the indoor regeneration heater 58 during a cooling operation of the heat pump type air conditioner 30. The electricity generating and air conditioning system further includes an outdoor dehumidifying agent body 80 to pre-heat outdoor air blown to the outdoor heat exchanger 35, an outdoor regeneration heater 90 to regenerate the outdoor dehumidifying agent body 80, a water-heating heat exchanger 130 to radiate heat from at least one of the cooling water heat exchanger 12 and exhaust gas heat exchanger 20, and a second heat transfer means 110' to transfer heat from at least one of the cooling water heat exchanger 12 and exhaust gas heat exchanger 20 to the outdoor regeneration heater 90 during the heating operation of the heat pump type air conditioner 30 and to transfer heat from at least one of the cooling water heat exchanger 12 and exhaust gas heat exchanger 20 to the water-heating heat exchanger 130 during the cooling operation of the heat pump type air conditioner 30.

The configurations and functions of the engine 2, generator 10, cooling water heat exchanger 12, exhaust gas heat exchanger 20, heat pump type air conditioner 30, compressor discharge line heater 40, indoor dehumidifier 50, and indoor regeneration heater 58 are the same as those of the first embodiment. Accordingly, these elements are designated by the same reference numerals as those of the first embodiment, and no detailed description thereof will be given.

Also, the outdoor dehumidifying agent body 80, outdoor regeneration heater 90, and water-heating heat exchanger 130 are the same as those of the third embodiment. Accordingly, these elements are designated by the same reference numerals as those of the third embodiment, and no detailed description thereof will be given.

The first heat transfer means 60 supplies heat from one of the cooling water heat exchanger 12 and exhaust gas heat exchanger 20, for example, the exhaust gas heat exchanger 20, to the compressor discharge line heater 40 or indoor regeneration heater 58.

The following description will be given only in conjunction with the case in which the first heat transfer means 60 transfers the heat of the exhaust gas heat exchanger 20. Since other configurations and functions of the first heat transfer means 60 are the same as those of the first embodiment, elements of the first heat transfer means 60 respectively corresponding to those of the first embodiment are designated by the same reference numerals, and no detailed description thereof will be given.

The second heat transfer means 110' supplies heat from the other one of the cooling water heat exchanger 12 and exhaust gas heat exchanger 20, for example, the cooling water heat exchanger 12, to the outdoor regeneration heater 90 or water-heating heat exchanger 130.

The following description will be given only in conjunction with the case in which the second heat transfer means 110' transfers the heat of the cooling water heat exchanger 12. Since other configurations and functions of the second heat transfer means 110' are the same as those of the third embodiment, elements of the second heat transfer means 110' respectively corresponding to those of the third embodiment are designated by the same reference numerals, and no detailed description thereof will be given.

Hereinafter, operation of the system having the above-described arrangement will be described.

When the heat pump type air conditioner 30 operates in a heating mode, the compressor 31 is driven by the electricity generated from the generator 10. In this case, the directional valve 32 is switched to a heating mode, and the heat medium circulation pump 66 is driven. The control valve 38 is also switched to a heating mode.

Also, the heat medium circulation pump 116 is driven, the control valve 118 is switched to a heating mode, and the outdoor dehumidifier 82 operates.

The circulation of the refrigerant and heat medium according to the above-described switching operations to the heating mode and driving operations, and the enhancement in the heating performance of the indoor heat exchanger 33 and the effect of preventing the outdoor heat exchanger 35 from being frosted according to the refrigerant and heat medium circulation are achieved in the same manner as in the fourth embodiment. Accordingly, no detailed description will be given.

On the other hand, when the heat pump type air conditioner 30 operates in a cooling mode, the compressor 31 is driven by the electricity generated from the generator 10. In this case, the directional valve 32 is switched to a cooling mode, and the heat medium circulation pump 66 is driven. The control valve 38 is also switched to a cooling mode.

Also, the heat medium circulation pump 116 is driven, and the control valve 118 is switched to a cooling mode.

In accordance with the switching operations to the cooling mode and driving operations, the waste heat of the exhaust gas heat exchanger 20 is used as a heat source for the indoor regeneration heater 58, thereby enhancing the pleasantness of a confined space to be cooled. Meanwhile, the waste heat of the cooling water heat exchanger 12 is transferred to the water-heating heat exchanger 130 so that the water-heating heat exchanger 130 can supply hot water to the hot water consumer 132.

Figure 11:
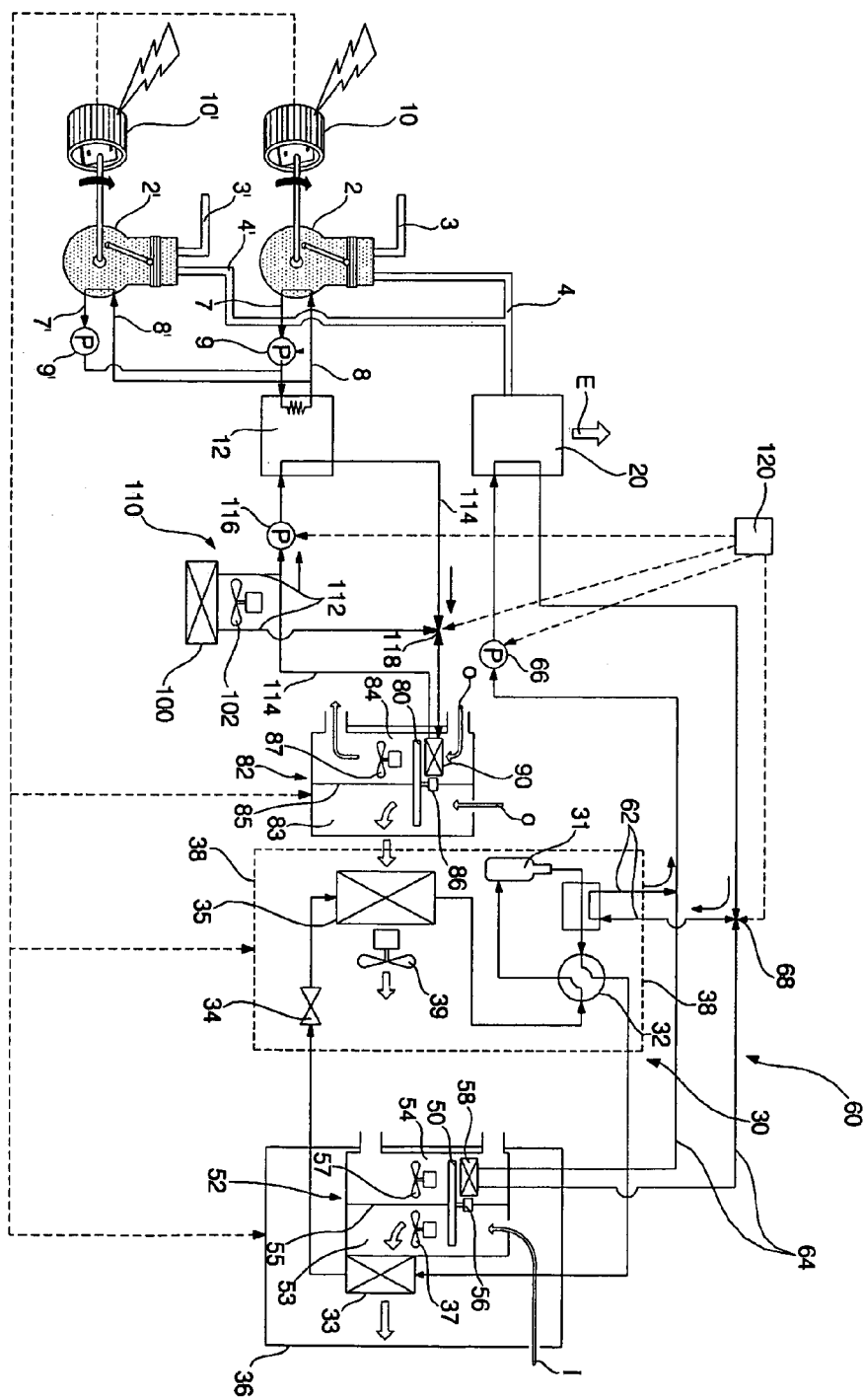
FIG. 11 is a schematic diagram of an electricity generating and air conditioning system with a dehumidifier according to a sixth embodiment of the present invention, illustrating a state in which the system operates in a heating mode.
Figure 12:
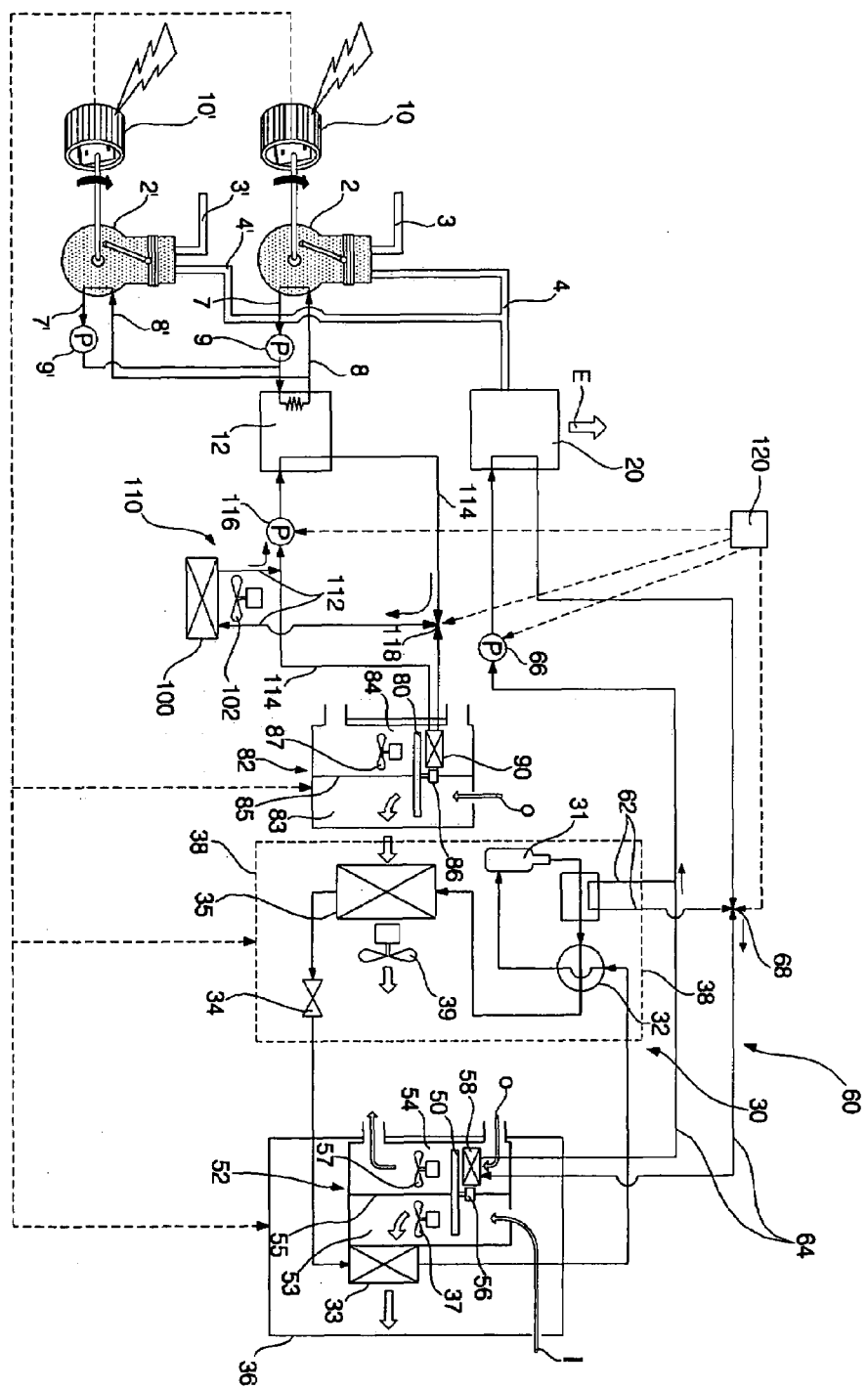
FIG. 12 is a schematic diagram of the electricity generating and air conditioning system with the dehumidifier according to the sixth embodiment of the present invention, illustrating a state in which the system operates in a cooling mode.

FIG. 11 is a schematic diagram of an electricity generating and air conditioning system with a dehumidifier according to a sixth embodiment of the present invention, illustrating a state in which the system operates in a heating mode. FIG. 12 is a schematic diagram of the electricity generating and air conditioning system with the dehumidifier according to the sixth embodiment of the present invention, illustrating a state in which the system operates in a cooling mode.

As shown in FIGS. 11 and 12, the electricity generating and air conditioning system includes a plurality of engines 2, 2' . . . . The electricity generating and air conditioning system also includes a plurality of generators 10, 10' . . . connected to respective shafts of the engines 2, 2' . . . .

One or more of the engines 2, 2' . . . operate in accordance with the load to be cooled or heated.

Fuel tubes 3, 3' . . . and exhaust tubes 4, 4' . . . are connected to respective engines 2, 2' . . . . Also, pairs of cooling water circulation conduits 7 and 8, 7' and 8' . . . are connected to respective engines 2, 2' . . . .

The exhaust gas tubes 4, 4' . . . are connected in parallel. The cooling water circulation conduits 7 and 8, 7' and 8' . . . are connected in parallel.

Cooling water circulation pumps 9, 9' . . . are directly connected to the cooling water circulation conduit 7 or 8, cooling water circulation conduit 7' or 8' . . . , respectively.

The electricity generating and air conditioning system of the sixth embodiment has the same configuration and functions as those of the fourth embodiment, except for the engines 2, 2' . . . and generators 10, 10' . . . . Accordingly, the constituent elements of the sixth embodiment respectively corresponding to those of the fourth embodiment are designated by the same reference numerals, and no detailed description thereof will be given.

Figure 13:
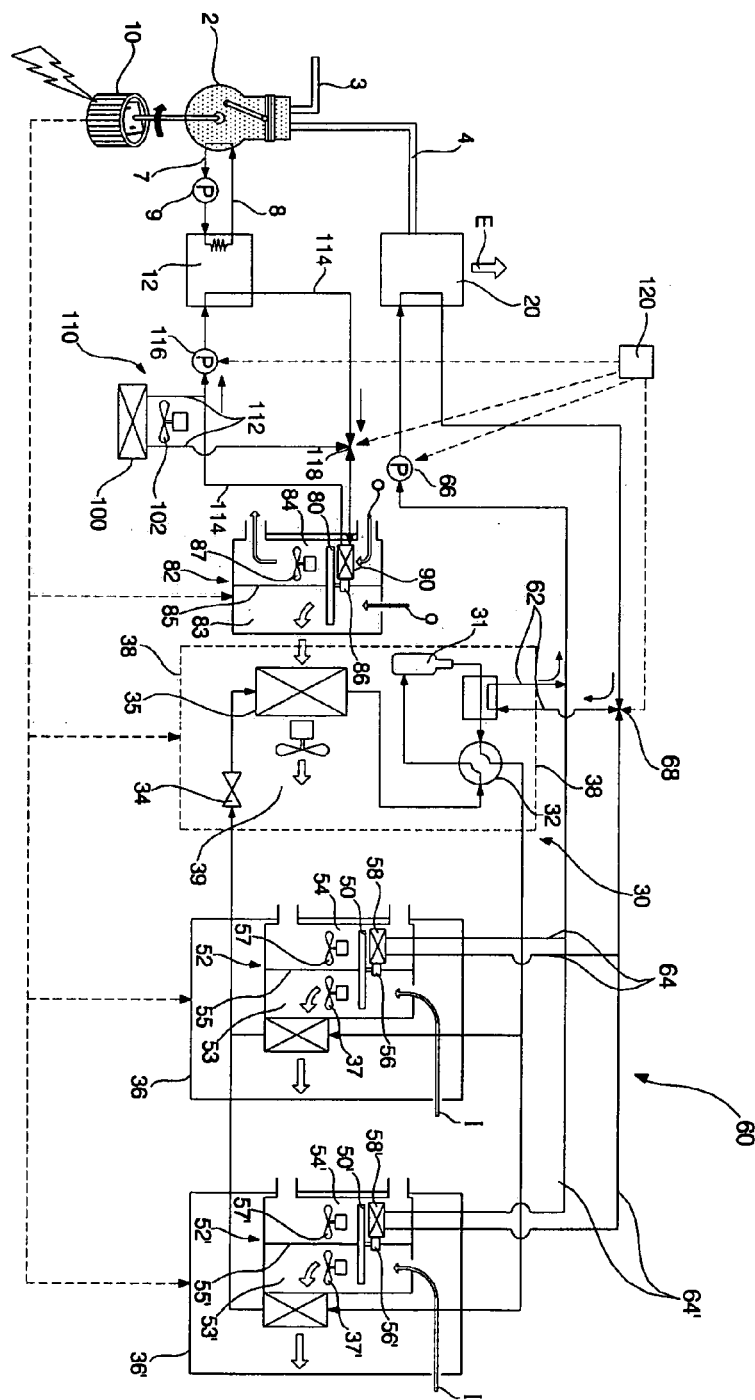
FIG. 13 is a schematic diagram of an electricity generating and air conditioning system with a dehumidifier according to a seventh embodiment of the present invention, illustrating a state in which the system operates in a heating mode.
Figure 14:
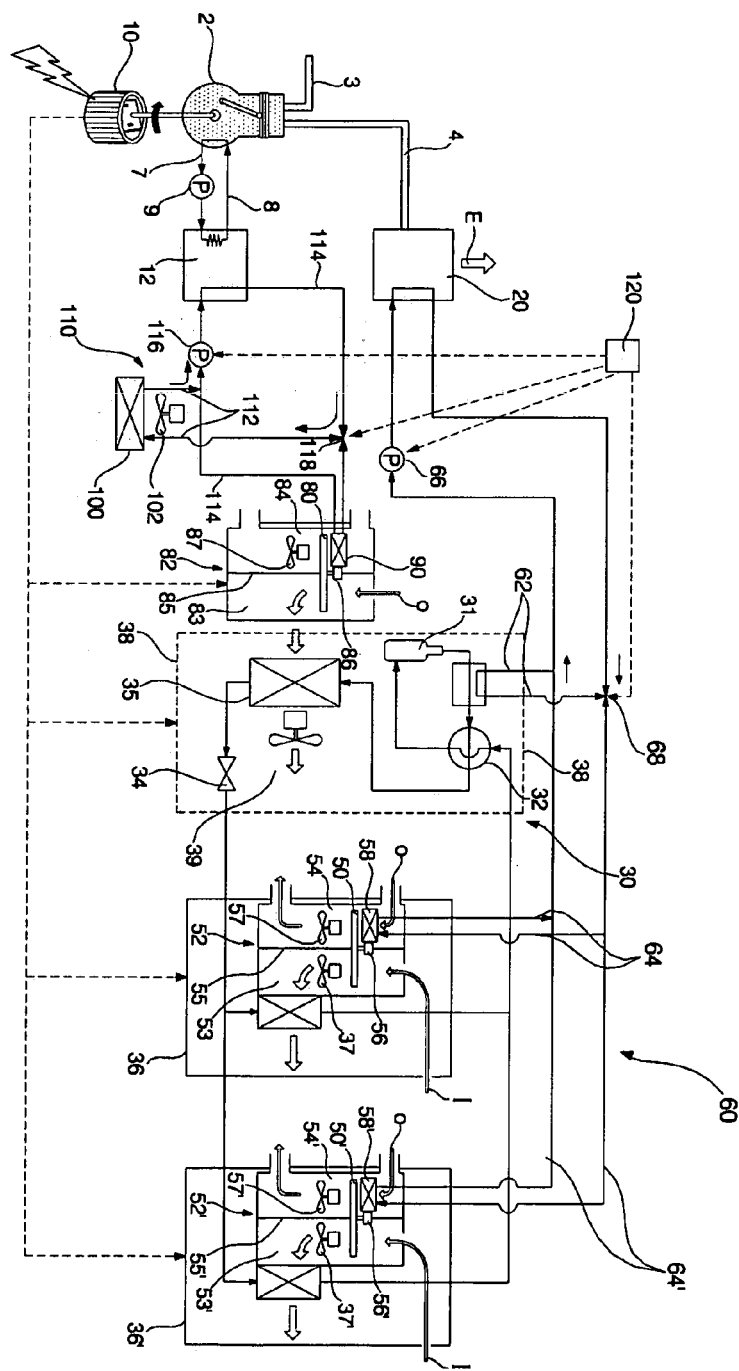
FIG. 14 is a schematic diagram of the electricity generating and air conditioning system with the dehumidifier according to the seventh embodiment of the present invention, illustrating a state in which the system operates in a cooling mode.

FIG. 13 is a schematic diagram of an electricity generating and air conditioning system with a dehumidifier according to a seventh embodiment of the present invention, illustrating a state in which the system operates in a heating mode. FIG. 14 is a schematic diagram of the electricity generating and air conditioning system with the dehumidifier according to the seventh embodiment of the present invention, illustrating a state in which the system operates in a cooling mode.

As shown in FIGS. 13 and 14, the heat pump type air conditioner, that is, the heat pump type air conditioner 30, which is included in the electricity generating and air conditioning system, is of a multi-type. That is, the heat pump type air conditioner 30 includes a plurality of indoor units 36, 36' . . . , and a single outdoor unit 38. The indoor units 36, 36' . . . include indoor heat exchangers 33, 33' . . . , which are connected in parallel, respectively.

The indoor units 36, 36' . . . also include indoor blowers 37, 37' . . . , respectively.

Indoor dehumidifiers 52, 52' . . . are also included in respective indoor units 36, 36' . . . . Respective Indoor dehumidifiers 52, 52' . . . include humidifying agent bodies 50, 50' . . . , and indoor regeneration heaters 58, 58' . . . .

Each of the indoor dehumidifiers 52, 52' . . . is the same as the dehumidifier included in the electricity generating and air conditioning system according to the first embodiment of the present invention, so that no detailed description thereof will be given.

Indoor regeneration heater circulation conduits 64, 64' . . . , which are connected in parallel, guide a heat medium to respective indoor regeneration heaters 58, 58' . . . of the indoor dehumidifiers 52, 52'.

The electricity generating and air conditioning system of this embodiment has the same configuration and functions as those of the fourth embodiment, except that the heat pump type air conditioner 30 includes a plurality of indoor units 36, 36' . . . , a plurality of indoor dehumidifiers 52, 52' . . . , and a plurality of indoor regeneration heater circulation conduits 64, 64' . . . . Accordingly, the constituent elements of the seventh embodiment respectively corresponding to those of the fourth embodiment are designated by the same reference numerals, and no detailed description thereof will be given.

Figure 15:
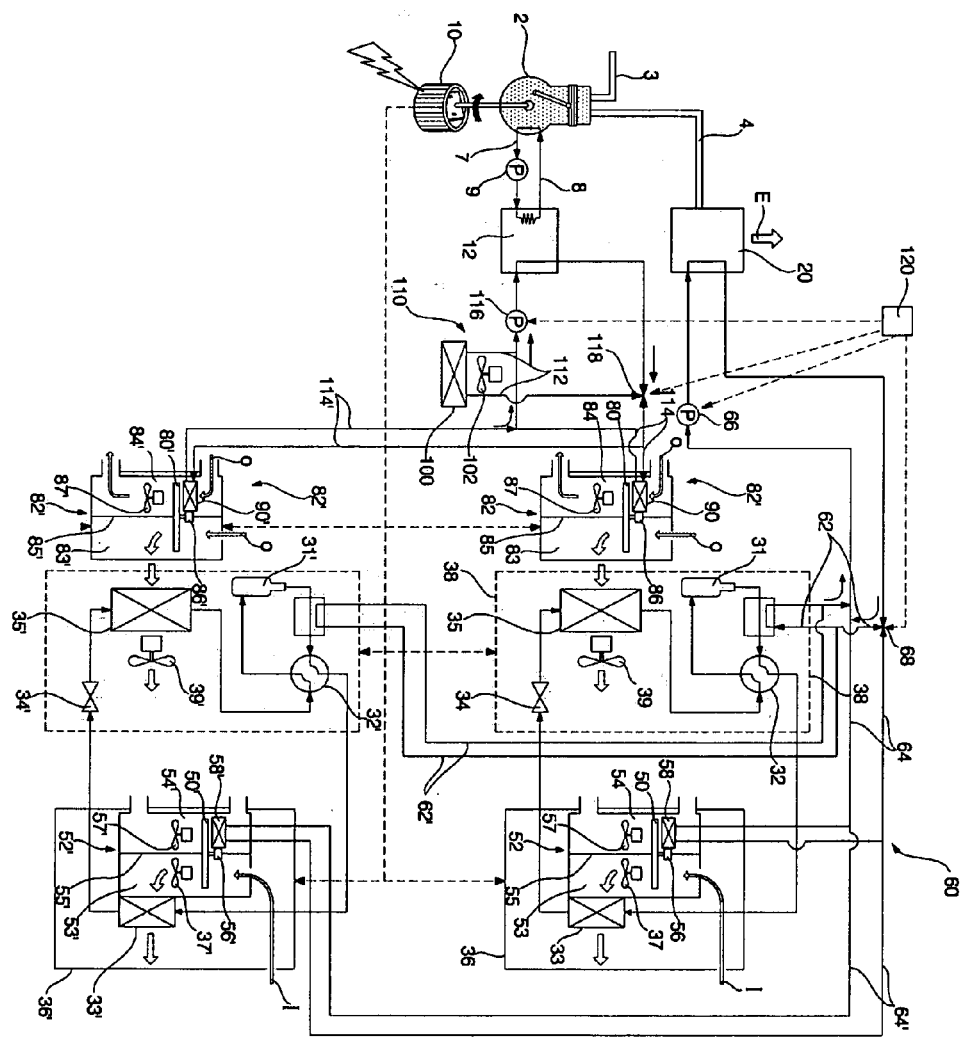
FIG. 15 is a schematic diagram of an electricity generating and air conditioning system with a dehumidifier according to an eighth embodiment of the present invention, illustrating a state in which the system operates in a heating mode.
Figure 16:
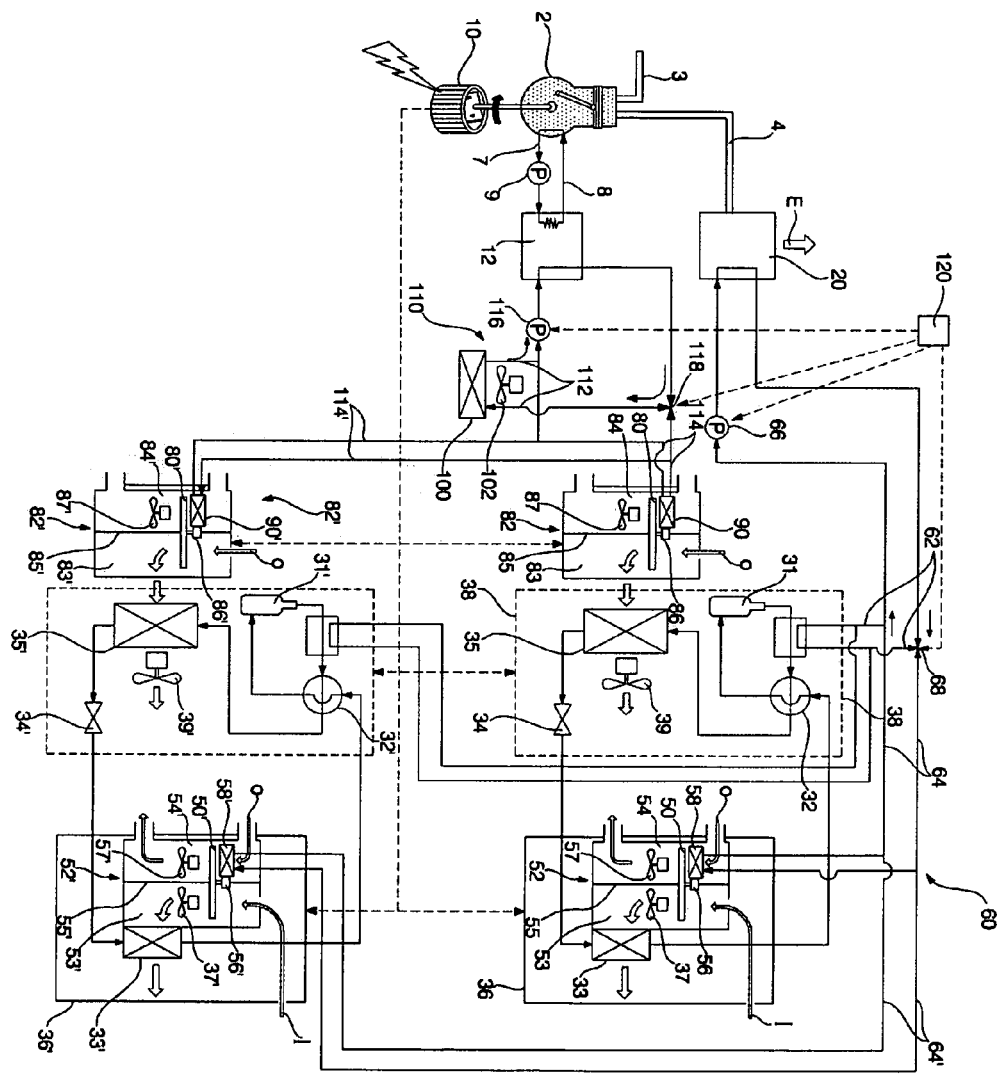
FIG. 16 is a schematic diagram of the electricity generating and air conditioning system with the dehumidifier according to the eighth embodiment of the present invention, illustrating a state in which the system operates in a cooling mode.

FIG. 15 is a schematic diagram of an electricity generating and air conditioning system with a dehumidifier according to an eighth embodiment of the present invention, illustrating a state in which the system operates in a heating mode. FIG. 16 is a schematic diagram of the electricity generating and air conditioning system with the dehumidifier according to the eighth embodiment of the present invention, illustrating a state in which the system operates in a cooling mode.

As shown in FIGS. 15 and 16, the heat pump type air conditioner, that is, the heat pump type air conditioner 30, which is included in the electricity generating and air conditioning system, includes a plurality of indoor units 36, 36' . . . , and a plurality of outdoor units 38, 38' . . . .

In the heat pump type air conditioner 30, refrigerant conduits respectively included in the indoor units 36, 36' . . . may be connected in parallel. Refrigerant conduits respectively included in the outdoor units 38, 38' . . . may also be connected in parallel. The following description will be given in conjunction with the case in which each of the outdoor units 38, 38' . . . are connected to an associated one of the indoor units 36, 36' . . . to constitute one air conditioner set, and each air conditioner set operates independently of other air conditioner sets.

The indoor units 36, 36' . . . include respective indoor heat exchangers 33, 33' . . . , and respective indoor blowers 37, 37' . . . .

Indoor humidifiers 52, 52' . . . are also included in respective indoor units 36, 36' . . . . Respective indoor humidifiers 52, 52' . . . include humidifying agent bodies 50, 50' . . . , and indoor regeneration heaters 58, 58' . . . .

Each of the indoor dehumidifiers 52, 52' . . . is the same as the dehumidifier included in the electricity generating and air conditioning system according to the first embodiment of the present invention, so that no detailed description thereof will be given.

Indoor regeneration heater circulation conduits 64, 64' . . . , which are connected in parallel, guide a heat medium to respective indoor regeneration heaters 58, 58' . . . of the indoor dehumidifiers 52, 52'.

The outdoor units 38, 38' . . . include respective compressors 31, 31' . . . , directional valves 32, 32' . . . , respective expansion devices 34, 34' . . . , respective outdoor heat exchangers 35, 35' . . . , and respective outdoor blowers 39, 39' . . . .

Compressor discharge line heaters 40, 40' . . . are arranged at respective discharge lines of the compressors 31, 31' . . . to heat high-temperature and high-pressure refrigerant gas compressed by the compressor 31 during a heating operation of the heat pump type air conditioner 30, before the refrigerant gas is introduced into the indoor heat exchangers 33, 33' . . . .

Compressor discharge line heater circulation conduits 62, 62' . . . , which are connected in parallel, are connected to respective compressor discharge line heaters 40, 40' . . . to guide a heat medium to be circulated through the compressor discharge line heaters 40, 40' . . . .

Outdoor dehumidifiers 82, 82' . . . are arranged upstream from respective outdoor heat exchangers 35, 35' . . . with respect to a flowing direction of outdoor air O blown to the outdoor heat exchangers 35, 35' . . . .

Each of the outdoor dehumidifiers 82, 82' . . . is the same as that of the second embodiment. Accordingly, the elements of the outdoor dehumidifiers 82, 82' . . . are designated by the same reference numerals as those of the second embodiment, respectively, and no detailed description thereof will be given.

Outdoor regeneration heater circulation conduits 114, 114' . . . , which are connected in parallel, are connected to respective outdoor regeneration heaters 90, 90' . . . of the outdoor dehumidifiers 82. 82' . . . to guide a heat medium to be circulated through the outdoor regeneration heaters 90, 90' . . . .

The electricity generating and air conditioning system of this embodiment has the same configuration and functions as those of the fourth embodiment, except that the heat pump type air conditioner 30 includes a plurality of indoor units 36, 36' . . . , a plurality of indoor dehumidifiers 52, 52' . . . , a plurality of outdoor units 38, 38' . . . , a plurality of compressor discharge line heaters 40, 40' . . . , a plurality of compressor discharge line heater circulation conduits 62, 62' . . . , a plurality of indoor regeneration heater circulation conduits 64, 64' . . . , and a plurality of outdoor regeneration heater circulation conduits 114, 114' . . . . Accordingly, the constituent elements of the eighth embodiment respectively corresponding to those of the fourth embodiment are designated by the same reference numerals, and no detailed description thereof will be given.

The electricity generating and air conditioning system with the dehumidifier according to any one of the above-described embodiments of the present invention has various effects.

That is, the electricity generating and air conditioning system according to the present invention has an advantage in that the waste heat of the engine is used to heat the refrigerant or to regenerate the indoor dehumidifying agent body, so that the system exhibits a high energy efficiency and enhances the pleasantness of a confined space to be air-conditioned.

The electricity generating and air conditioning system according to the present invention also has advantages in that the waste heat of the engine is used to prevent the outdoor heat exchanger from being frosted or is simply discharged to the atmosphere, so that the system exhibits a high heating performance and a high radiation performance.

In addition, the electricity generating and air conditioning system according to the present invention also has advantages in that the waste heat of the engine is used to prevent the outdoor heat exchanger from being frosted or to heat water, so that the system exhibits a high heating performance and a high energy efficiency.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An electricity generating and air conditioning system comprising:
    an engine;
    a generator connected to an output shaft of the engine to generate electricity;
    a heat pump air conditioner, through which a refrigerant is circulated, the heat pump air conditioner comprising a compressor, a directional valve, an outdoor heat exchanger, an expansion device, and an indoor heat exchanger;
    an indoor dehumidifying agent body to dehumidify indoor air;
    an indoor regeneration heater to regenerate the indoor dehumidifying agent body; and
    waste heat recovering means to supply waste heat of the engine to the indoor regeneration heater during a cooling mode of the heat pump air conditioner to allow the indoor regeneration heater to use the supplied waste heat as a heat source for regenerating the indoor dehumidifying agent body, and to supply the waste heat of the engine to the refrigerant of the heat pump air conditioner during a heating mode of the heat pump air conditioner.

2. The electricity generating and air conditioning system according to claim 1, wherein the waste heat recovering means comprises:
    a cooling water heat exchanger to absorb heat from cooling water used to cool the engine; and
    an exhaust gas heat exchanger to absorb heat from exhaust gas discharged from the engine.

3. The electricity generating and air conditioning system according to claim 2, wherein the waste heat recovering means further comprises:
    a compressor discharge line heater to heat a discharge line of the compressor; and
    heat transfer means to transfer heat from at least one of the cooling water heat exchanger and the exhaust gas heat exchanger to the compressor discharge line heater during a heating operation of the heat pump air conditioner, and to transfer heat from at least one of the cooling water heat exchanger and the exhaust gas heat exchanger to the indoor regeneration heater during a cooling operation of the heat pump air conditioner.

4. The electricity generating and air conditioning system according to claim 2, further comprising:
    an outdoor dehumidifying agent body to dehumidify outdoor air blown to the outdoor heat exchanger;
    an outdoor regeneration heater to regenerate the outdoor dehumidifying agent body; and
    a radiating heat exchanger to radiate heat from at least one of the cooling water heat exchanger and the exhaust gas heat exchanger.

5. The electricity generating and air conditioning system according to claim 4, wherein the waste heat recovering means further comprises:
    second heat transfer means to transfer heat from at least one of the cooling water heat exchanger and the exhaust gas heat exchanger to the outdoor regeneration heater during a heating operation of the heat pump air conditioner, and to transfer heat from at least one of the cooling water heat exchanger and the exhaust gas heat exchanger to the radiating heat exchanger during a cooling operation of the heat pump air conditioner.

6. The electricity generating and air conditioning system according to claim 2, further comprising:
    an outdoor dehumidifying agent body to dehumidify outdoor air blown to the outdoor heat exchanger;
    an outdoor regeneration heater to regenerate the outdoor dehumidifying agent body; and
    a water-heating heat exchanger to heat water.

7. The electricity generating and air conditioning system according to claim 6, wherein the waste heat recovering means further comprises:
    second heat transfer means to transfer heat from at least one of the cooling water heat exchanger and the exhaust gas heat exchanger to the outdoor regeneration heater during a heating operation of the heat pump air conditioner, and to transfer heat from at least one of the cooling water heat exchanger and the exhaust gas heat exchanger to the water-heating heat exchanger during a cooling operation of the heat pump air conditioner.

8. The electricity generating and air conditioning system according to claim 7, wherein the second heat transfer means comprises:
    a water-heating heat exchanger circulation conduit to guide a heat medium to be circulated through at least one of the cooling water heat exchanger and the exhaust gas heat exchanger, and through the water-heating heat exchanger;
    an outdoor regeneration heater circulation conduit to guide the heat medium to be circulated through at least one of the cooling water heat exchanger and the exhaust gas heat exchanger, and through the outdoor regeneration heater;
    a heat medium circulation pump to pump the heat medium, and thus, to circulate the heat medium through the water-heating heat exchanger circulation conduit or through the outdoor regeneration heater circulation conduit; and a control valve to alternately open/close the water-heating heat exchanger circulation conduit and the outdoor regeneration heater circulation conduit.

9. The electricity generating and air conditioning system according to claim 8, wherein the second heat transfer means comprises:

a controller to control the control valve to operate, during a heating operation of the heat pump air conditioner, in the heating mode in which the water-heating heat exchanger circulation conduit is closed, and the outdoor regeneration heater circulation conduit is opened, and to control the control valve to operate, during a cooling operation of the heat pump air conditioner, in the cooling mode in which the water-heating heat exchanger circulation conduit is opened, and the outdoor regeneration heater circulation conduit is closed.

10. The electricity generating and air conditioning system according to claim 1, wherein the heat pump air conditioner uses the electricity generated from the generator.

11. An electricity generating and air conditioning system comprising:

an engine;

a generator connected to an output shaft of the engine to generate electricity;

a heat pump air conditioner, through which a refrigerant is circulated, the heat pump air conditioner comprising a compressor, a directional valve, an outdoor heat exchanger, an expansion device, and an indoor heat exchanger;

an indoor dehumidifying agent body to dehumidify indoor air;

an indoor regeneration heater to regenerate the indoor dehumidifying agent body; and waste heat recovering means to supply waste heat of the engine to the indoor regeneration heater, and thus, to allow the indoor regeneration heater to use the supplied waste heat as a heat source for the regeneration of the indoor dehumidifying agent body, or to supply the waste heat of the engine to the refrigerant of the heat pump air conditioner, wherein the waste heat recovering means comprises:

a cooling water heat exchanger to absorb heat from cooling water used to cool the engine; and an exhaust gas heat exchanger to absorb heat from exhaust gas discharged from the engine, wherein the waste heat recovering means further comprises:

a compressor discharge line heater to heat a discharge line of the compressor; and heat transfer means to transfer heat from at least one of the cooling water heat exchanger and the exhaust gas heat exchanger to the compressor discharge line heater during a heating operation of the heat pump air conditioner, and to transfer heat from at least one of the cooling water heat exchanger and the exhaust gas heat exchanger to the indoor regeneration heater during a cooling operation of the heat pump air conditioner, wherein the heat transfer means comprises:

a compressor discharge line heater circulation conduit to guide a heat medium to be circulated through at least one of the cooling water heat exchanger and the exhaust gas heat exchanger, and through the compressor discharge line heater;

an indoor regeneration heater circulation conduit to guide the heat medium to be circulated through at least one of the cooling water heat exchanger and the exhaust gas heat exchanger, and through the indoor regeneration heater;

a heat medium circulation pump to pump the heat medium, and thus, to circulate the heat medium through the compressor discharge line heater circulation conduit or through the indoor regeneration heater circulation conduit; and a control valve to alternately open/close the compressor discharge line heater circulation conduit and the indoor regeneration heater circulation conduit.

12. The electricity generating and air conditioning system according to claim 11, wherein the heat transfer means comprises:

a controller to control the control valve to operate, during a heating operation of the heat pump air conditioner, in a heating mode in which the indoor regeneration heater circulation conduit is closed, and the compressor discharge line heater circulation conduit is opened, and to control the control valve to operate, during a cooling operation of the heat pump air conditioner, in a cooling mode in which the indoor regeneration heater circulation conduit is opened, and the compressor discharge line heater circulation conduit is closed.

13. An electricity generating and air conditioning system comprising:

an engine;

a generator connected to an output shaft of the engine to generate electricity;

a heat pump air conditioner, through which a refrigerant is circulated, the heat pump air conditioner comprising a compressor, a directional valve, an outdoor heat exchanger, an expansion device, and an indoor heat exchanger;

an indoor dehumidifying agent body to dehumidify indoor air;

an indoor regeneration heater to regenerate the indoor dehumidifying agent body; and waste heat recovering means to supply waste heat of the engine to the indoor regeneration heater, and thus, to allow the indoor regeneration heater to use the supplied waste heat as a heat source for the regeneration of the indoor dehumidifying agent body, or to supply the waste heat of the engine to the refrigerant of the heat pump air conditioner, wherein the waste heat recovering means comprises:

a cooling water heat exchanger to absorb heat from cooling water used to cool the engine; and an exhaust gas heat exchanger to absorb heat from exhaust gas discharged from the engine, wherein the electricity generating and air conditioning system further comprises:

an outdoor dehumidifying agent body to dehumidify outdoor air blown to the outdoor heat exchanger;

an outdoor regeneration heater to regenerate the outdoor dehumidifying agent body; and a radiating heat exchanger to radiate heat from at least one of the cooling water heat exchanger and the exhaust gas heat exchanger, wherein the waste heat recovering means further comprises:

second heat transfer means to transfer heat from at least one of the cooling water heat exchanger and the exhaust gas heat exchanger to the outdoor regeneration heater during a heating operation of the heat pump air conditioner, and to transfer heat from at least one of the cooling water heat exchanger and the exhaust gas heat exchanger to the radiating heat exchanger during a cooling operation of the heat pump air conditioner, wherein the second heat transfer means comprises:
a radiating heat exchanger circulation conduit to guide a heat medium to be circulated through at least one of the cooling water heat exchanger and the exhaust gas heat exchanger, and through the radiating heat exchanger;
an outdoor regeneration heater circulation conduit to guide the heat medium to be circulated through at least one of the cooling water heat exchanger and the exhaust gas heat exchanger, and through the outdoor regeneration heater;
a heat medium circulation pump to pump the heat medium, and thus, to circulate the heat medium through the radiating heat exchanger circulation conduit or through the outdoor regeneration heater circulation conduit; and
a control valve to alternately open/close the radiating heat exchanger circulation conduit and the outdoor regeneration heater circulation conduit.

14. The electricity generating and air conditioning system according to claim 13, wherein the second heat transfer means comprises:
a controller to control the control valve to operate, during a heating operation of the heat pump air conditioner, in a heating mode in which the radiating heat exchanger circulation conduit is closed, and the outdoor regeneration heater circulation conduit is opened, and to control the control valve to operate, during a cooling operation of the heat pump air conditioner, in a cooling mode in which the radiating heat exchanger circulation conduit is opened, and the outdoor regeneration heater circulation conduit is closed.

15. An electricity generating and air conditioning system comprising:
an engine;
a generator connected to an output shaft of the engine to generate electricity;
a heat pump air conditioner, through which a refrigerant is circulated, the heat pump air conditioner comprising a compressor, a directional valve, an outdoor heat exchanger, an expansion device, and an indoor heat exchanger;
an outdoor dehumidifying agent body to dehumidify outdoor air blown to the outdoor heat exchanger;
an outdoor regeneration heater to regenerate the outdoor dehumidifying agent body;
a radiating heat exchanger to radiate heat from at least one of the cooling water heat exchanger and the exhaust gas heat exchanger; and
waste heat recovering means to supply waste heat of the engine to the outdoor regeneration heater during a heating mode of the heat pump air conditioner to allow the outdoor regeneration heater to use the supplied waste heat as a heat source for the regeneration of the outdoor dehumidifying agent body, and to supply the waste heat of the engine to the radiating heat exchanger during a cooling mode of the heat pump air conditioner.

16. The electricity generating and air conditioning system according to claim 15, wherein the heat pump air conditioner uses the electricity generated from the generator.

17. The electricity generating and air conditioning system according to claim 15, wherein at least one of the engine, the generator, the compressor, the directional valve, the outdoor heat exchanger, the expansion device, and the indoor heat exchanger comprises a plurality of ones.

* * * * *